US012784692B2

(12) United States Patent
Yokoyama et al.

(10) Patent No.: US 12,784,692 B2
(45) Date of Patent: Nov. 3, 2026

(54) DISPLAY DEVICE

(71) Applicant: Sony Semiconductor Solutions Corporation, Kanagawa (JP)

(72) Inventors: Kazuki Yokoyama, Kanagawa (JP); Kouichi Hashikaki, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 2 days.

(21) Appl. No.: 19/099,946

(22) PCT Filed: Aug. 8, 2023

(86) PCT No.: PCT/JP2023/028924
§ 371 (c)(1),
(2) Date: Jan. 30, 2025

(87) PCT Pub. No.: WO2024/048221
PCT Pub. Date: Mar. 7, 2024

(65) Prior Publication Data
US 2026/0148698 A1 May 28, 2026

(30) Foreign Application Priority Data
Aug. 30, 2022 (JP) ................................ 2022-137097

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2300/0842* (2013.01); *G09G 2300/0852* (2013.01); *G09G 2310/0259* (2013.01); *G09G 2310/0291* (2013.01); *G09G 2310/066* (2013.01); *G09G 2320/0271* (2013.01); *G09G 2330/021* (2013.01); *G09G 2380/10* (2013.01)

(58) Field of Classification Search
None
See application file for complete search history.

(56) References Cited

U.S. PATENT DOCUMENTS 5,489,918 A 2/1996 Mosier
2010/0225671 A1* 9/2010 Makino .................. G09G 3/294 345/63
(Continued)

FOREIGN PATENT DOCUMENTS

JP 2014089306 A 5/2014
JP 2021117369 A 8/2021

OTHER PUBLICATIONS

International Search Report (PCT/ISA/210), International Application No. PCT/JP2023/028924, dated Oct. 10, 2023.

*Primary Examiner* — Stephen T. Reed
(74) *Attorney, Agent, or Firm* — Michael Best & Friedrich LLP

(57) ABSTRACT

A display device includes: a voltage generation circuit; and a plurality of pixels each emitting light with luminance corresponding to a gradation voltage obtained from a generated voltage of the voltage generation circuit, in which the generated voltage includes: a ramp voltage; and a non-ramp voltage including a voltage outside a voltage range of the ramp voltage, and the non-ramp voltage includes a voltage corresponding to a gradation voltage that minimizes luminance of the pixels.

10 Claims, 18 Drawing Sheets

(56) References Cited

U.S. PATENT DOCUMENTS

2012/0050253 A1* 3/2012 Sakai .................. G09G 3/2927
345/212
2025/0054449 A1* 2/2025 Tsuchiya .................. G09F 9/30

* cited by examiner

DISPLAY DEVICE

FIELD

The present disclosure relates to a display device.

BACKGROUND

For example, as disclosed in Patent Literature 1, technology of obtaining a gradation signal of a pixel of a display device from a ramp voltage is known.

CITATION LIST

Patent Literature

Patent Literature 1: JP 2021-117369 A

SUMMARY

Technical Problem

Improving gradation characteristics such as gradation resolution is one of important issues. As an idea, it is conceivable to bring a low gradation voltage closer to a high gradation voltage. Since more gradation voltages can be obtained from a ramp voltage in the same voltage range, gradation characteristics are improved. However, the contrast decreases.

One aspect of the present disclosure achieves both improvement in gradation characteristics and suppression of a reduction in the contrast.

Solution to Problem

A display device according to one aspect of the present disclosure includes: a voltage generation circuit; and a plurality of pixels each emitting light with luminance corresponding to a gradation voltage obtained from a generated voltage of the voltage generation circuit, wherein the generated voltage includes: a ramp voltage; and a non-ramp voltage including a voltage outside a voltage range of the ramp voltage, and the non-ramp voltage includes a voltage corresponding to a gradation voltage that minimizes luminance of the pixel.

DESCRIPTION OF EMBODIMENTS

Hereinafter, embodiments of the present disclosure will be described in detail on the basis of the drawings. Note that in each of the following embodiments, the same elements are denoted by the same symbols, and redundant description will be omitted.

The present disclosure will be described in the following order of items.

0. Introduction
1. Embodiments
2. Modifications
3. Exemplary Effects
4. Examples of Pixel Circuit
5. Exemplary Use Cases

0. INTRODUCTION

By using a ramp voltage for generation of gradation voltages of pixels, advantages such as suppression of the circuit scale and the power consumption can be achieved as compared with a case of dividing a resistance voltage or the like. For example, as known from the fact that gamma correction to the power of 2.2 is performed, the mode of change of the ramp voltage and the mode of change of the luminance are different from each other. Particularly, at low gradation levels, a small change in luminance requires a large change in the ramp voltage, and thus a significant portion of the voltage range of the ramp voltage is allocated to low gradation levels. As a result, the voltage range of the ramp voltage that can be allocated to high gradations is reduced, and the gradation characteristics are deteriorated.

As one idea, it is conceivable to bring a gradation voltage corresponding to the lowest luminance (for example, black luminance) closer to a gradation voltage corresponding to the highest luminance. Since more gradation voltages can be obtained from the ramp voltage in the same voltage range, gradation characteristics are improved accordingly. However, the contrast decreases. According to the disclosed technology, both improvement of gradation characteristics and suppression of a reduction in the contrast can be achieved.

1. EMBODIMENTS

Figure 1:
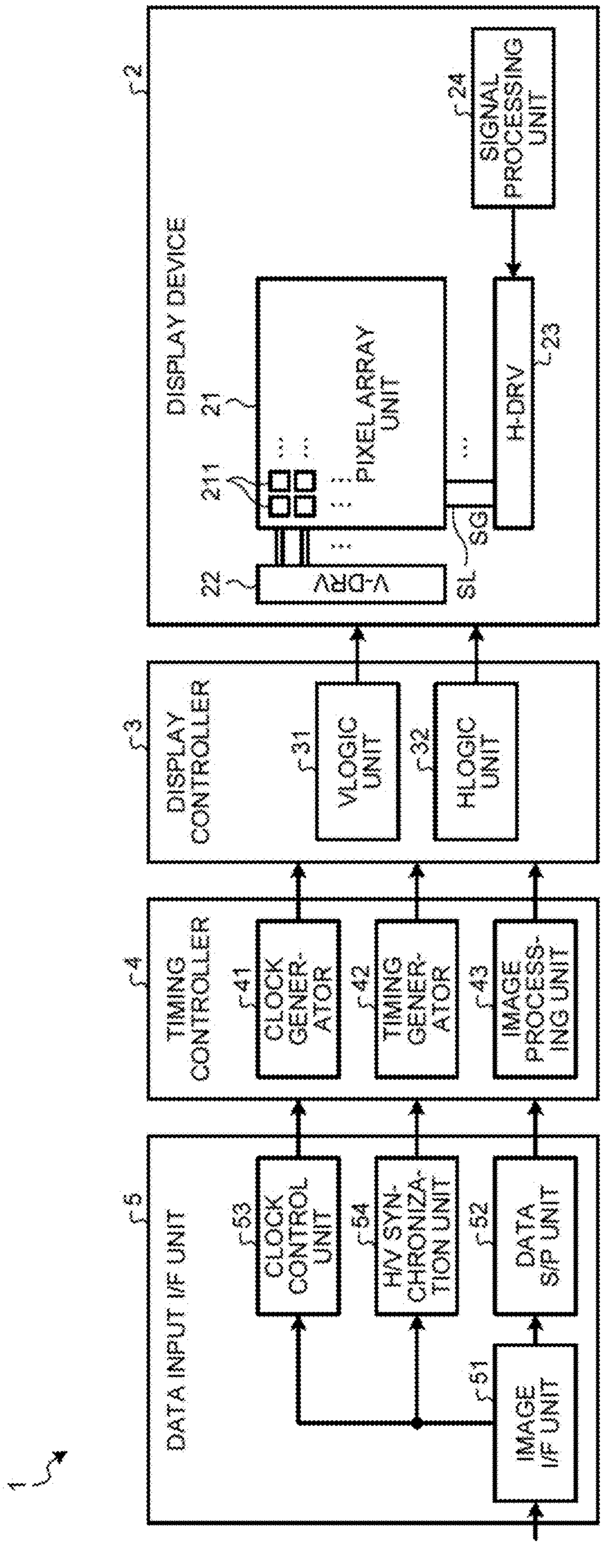
FIG. 1 is a diagram illustrating an exemplary schematic configuration of a display system including a display device according to an embodiment.

FIG. 1 is a diagram illustrating an exemplary schematic configuration of a display system including a display device according to an embodiment. A display system 1 includes a display device 2, a display controller 3, a timing controller 4, and a data input I/F unit 5. A part or the entirety of the display controller 3, the timing controller 4, and the data input I/F unit 5 may be included in the display device 2.

The display device 2 displays a video based on a video signal. The display device 2 includes a pixel array unit 21, a V-DRV 22, an H-DRV 23, and a signal processing unit 24.

The pixel array unit 21 includes a plurality of pixels 211. The plurality of pixels 211 is arranged in an array shape in a horizontal direction and a vertical direction. The horizontal direction and the vertical direction may be construed as a lateral direction and a longitudinal direction, respectively, on a display plane.

Each of the plurality of pixels 211 emits light at luminance corresponding to a gradation voltage SG. A pixel 211 includes, for example, a light emitting element and a peripheral circuit. Examples of the light emitting element include an organic light emitting diode (OLED) and others. Examples of elements of the peripheral circuit include a transistor, a capacitor, and others. Note that, since the pixel 211 includes not only the light emitting element but also the peripheral circuit, the pixel 211 can also be referred to as a pixel circuit. A pixel and a pixel circuit may be read interchangeably as long as there is no inconsistency.

The V-DRV 22 is a vertical driver that scans and drives pixels 211 corresponding to a display line in the horizontal direction. The V-DRV 22 is connected to the pixel array unit 21 via a plurality of control lines. For example, one control line is connected to each of pixels 211 arranged in the horizontal direction. The V-DRV 22 selects a control line and supplies a control signal to corresponding pixels 211 to control light emission and non-light emission of the pixels 211.

The H-DRV 23 is a horizontal driver that selects and drives pixels 211 corresponding to a display line in the vertical direction. The H-DRV 23 is connected to the pixel array unit 21 via a plurality of signal lines SL. For example, one signal line SL is connected to each of pixels 211 arranged in the vertical direction. The H-DRV 23 selects a signal line SL and supplies the gradation voltage SG to each of a plurality of pixels 211. As a result, the luminance of each of the pixels 211 is controlled (gradation control).

The signal processing unit 24 processes a video signal. An example of the processing is gamma correction. Further details of the display device 2 including the signal processing unit 24 will be described later.

The display controller 3 includes a VLOGIC unit 31 and an HLOGIC unit 32. The VLOGIC unit 31 supplies a signal that defines operation timing of the V-DRV 22 of the display device 2 to the V-DRV 22. The V-DRV 22 selects or drives pixels 211 on the basis of the signal from the VLOGIC unit 31. The HLOGIC unit 32 supplies a video signal to the H-DRV 23 or the signal processing unit 24.

The timing controller 4 includes a clock generator 41, a timing generator 42, and an image processing unit 43. The clock generator 41 generates a vertical synchronization clock and a horizontal synchronization clock and supplies the vertical synchronization clock and the horizontal synchronization clock to the display controller 3. The timing generator 42 generates a signal that defines operation timing of the display controller 3 and supplies the signal to the display controller 3. The image processing unit 43 performs various types of image processing on the video signal input to the data input I/F unit 5. The video signal having been subjected to the image processing is supplied to the HLOGIC unit 32 of the display controller 3.

The data input I/F unit 5 includes an image I/F unit 51, a data S/P unit 52, a clock control unit 53, and an H/V synchronization unit 54. The image I/F unit 51 receives a video signal from the outside. The video signal is serial digital data. The data S/P unit 52 converts the video signal into parallel data and then transmits the parallel data to the image processing unit 43 of the timing controller 4. The clock control unit 53 generates a clock suitable for a display frequency of the display device 2 and transmits the clock to the clock generator 41 of the timing controller 4. The H/V synchronization unit 54 generates a signal that defines horizontal synchronization timing and vertical synchronization timing of the display device 2 and transmits the signal to the timing generator 42 of the timing controller 4.

The display device 2 will be further described. As described above, each of the plurality of pixels 211 of the pixel array unit 21 emits light with luminance corresponding to the gradation voltage SG. Various known pixel configurations may be adopted. An example will be described with reference to FIG. 2.

Figure 2:
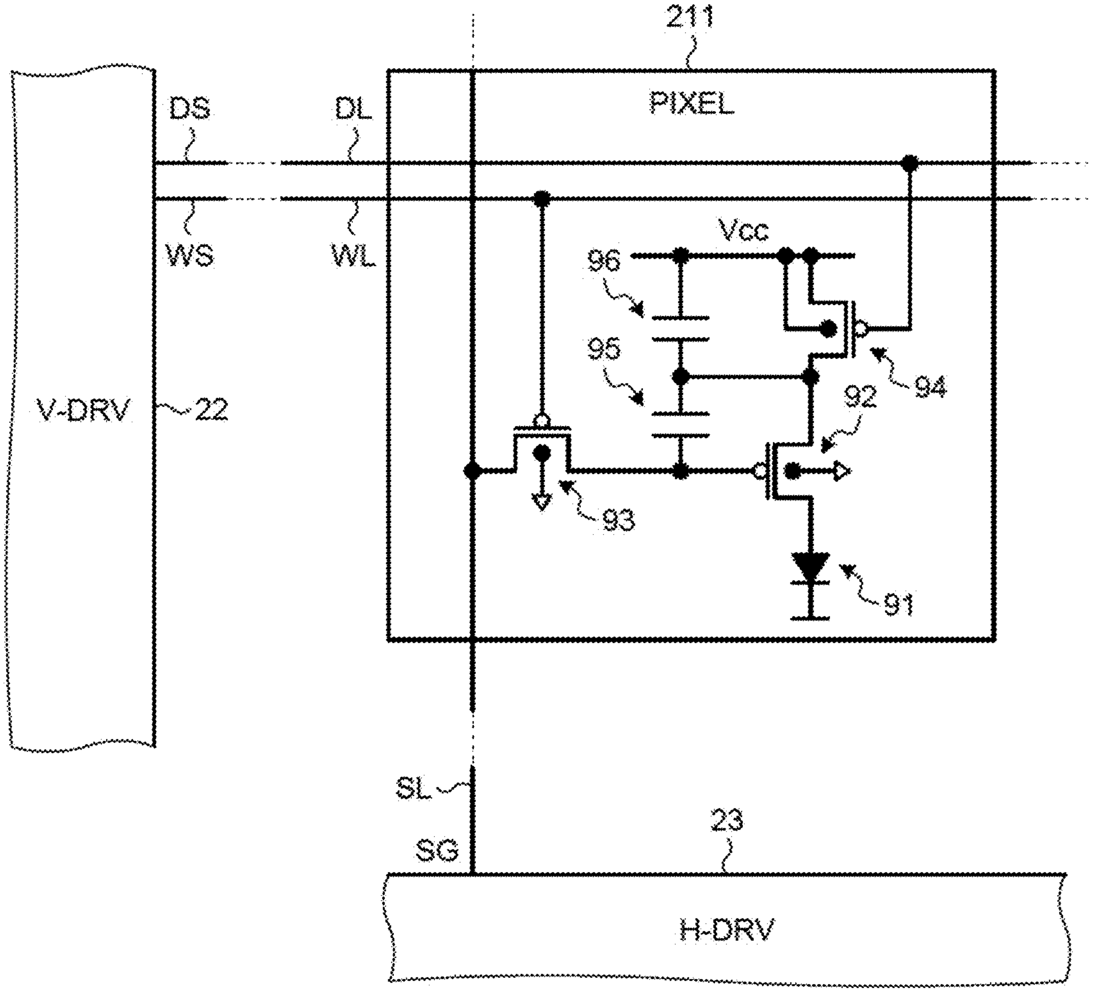
FIG. 2 is a diagram illustrating an exemplary pixel configuration.

FIG. 2 is a diagram illustrating an exemplary pixel configuration. A circuit configuration of one pixel 211 and a connection configuration with the V-DRV 22 and the H-DRV 23 are illustrated. A control line WL and a control line DL are described as examples of the control lines extending from the V-DRV 22 to a pixel 211. A control signal WS for scanning the pixel 211 is supplied via the control line WL. A control signal DS for controlling light emission and non-light emission of the pixel 211 is supplied via the control line DL. Furthermore, the gradation voltage SG is supplied via a signal line SL extending from the H-DRV 23 to the pixel 211.

The pixel 211 includes a light emitting element 91, a transistor 92, a transistor 93, a transistor 94, a capacitor 95, and a capacitor 96. The illustrated transistors 92 to 94 are PMOS transistors to which a power supply voltage is applied to respective back gates.

The transistor 93 samples the gradation voltage SG from the H-DRV 23. The transistor 94 is connected between a power supply node of a power supply voltage Vcc and a source electrode of the transistor 92 and controls light emission and non-light emission of the light emitting element 91 on the basis of the control signal DS.

The capacitor 95 is connected between a gate electrode and a source electrode of the transistor 92 and holds the gradation voltage SG sampled by the transistor 93. The transistor 92 drives the light emitting element 91 by causing a drive current corresponding to the gradation voltage SG held by the capacitor 95 to flow through the light emitting element 91. The capacitor 96 is connected between the source electrode of the transistor 92 and a node of a fixed potential, for example, the power supply node of the power supply voltage Vcc. The capacitor 96 suppresses fluctuations in a source potential of the transistor 92 when the gradation voltage SG is written and adjusts a gate-source voltage of the transistor 92 to a threshold voltage of the transistor 92.

For example, with the configuration as described above, the pixel 211 emits light with luminance corresponding to the gradation voltage SG. The above pixel configuration is merely an example, and some examples of other configurations will be described later with reference to FIGS. 12 to 19.

The gradation voltage SG of each of the plurality of pixels 211 is controlled by the H-DRV 23 and the signal processing unit 24. This will be described with reference to FIG. 3.

Figure 3:
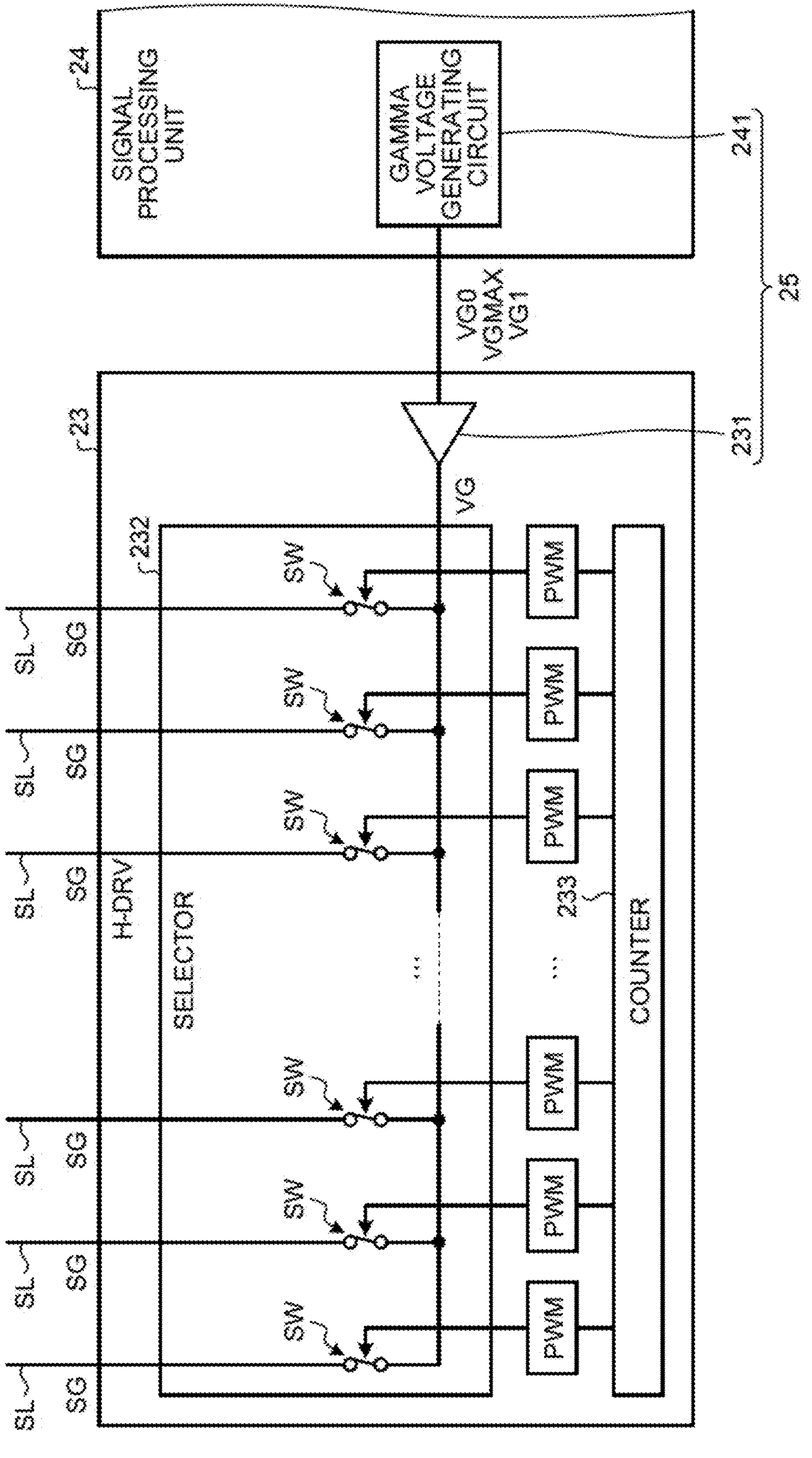
FIG. 3 is a diagram illustrating an exemplary schematic configuration of an H-DRV and a signal processing unit.

FIG. 3 is a diagram illustrating an exemplary schematic configuration of the H-DRV and the signal processing unit. As components of the H-DRV 23, a buffer circuit 231, a selector 232, and a counter 233 are illustrated as an example. As components of the signal processing unit 24, a gamma voltage generating circuit 241 is exemplified. The buffer circuit 231 and the gamma voltage generating circuit 241 are also collectively referred to as a voltage generation circuit 25.

The gamma voltage generating circuit 241 of the voltage generation circuit 25 generates voltages corresponding to some gradations after gamma correction. In this example, the gamma voltage generating circuit 241 generates a voltage VG0, a voltage VGMAX, and a voltage VG1. The voltage VG0 corresponds to a gradation voltage (zero gradation voltage) that minimizes the luminance of the pixel 211. The voltage VGMAX corresponds to a gradation voltage (MAX gradation voltage) that maximizes the luminance of the pixel 211. The voltage VG1 corresponds to a gradation voltage (one gradation voltage) that increases the luminance of the pixel 211 by one stage from the lowest luminance.

The buffer circuit 231 of the voltage generation circuit 25 generates and outputs a voltage for obtaining the gradation voltage SG on the basis of a voltage (for example, with reference to the voltage) from the gamma voltage generating circuit 241. A voltage generated by the buffer circuit 231 is referred to as a generated voltage VG of the voltage generation circuit 25 in the drawing. The generated voltage VG will be described with reference to FIG. 4.

Figure 4:
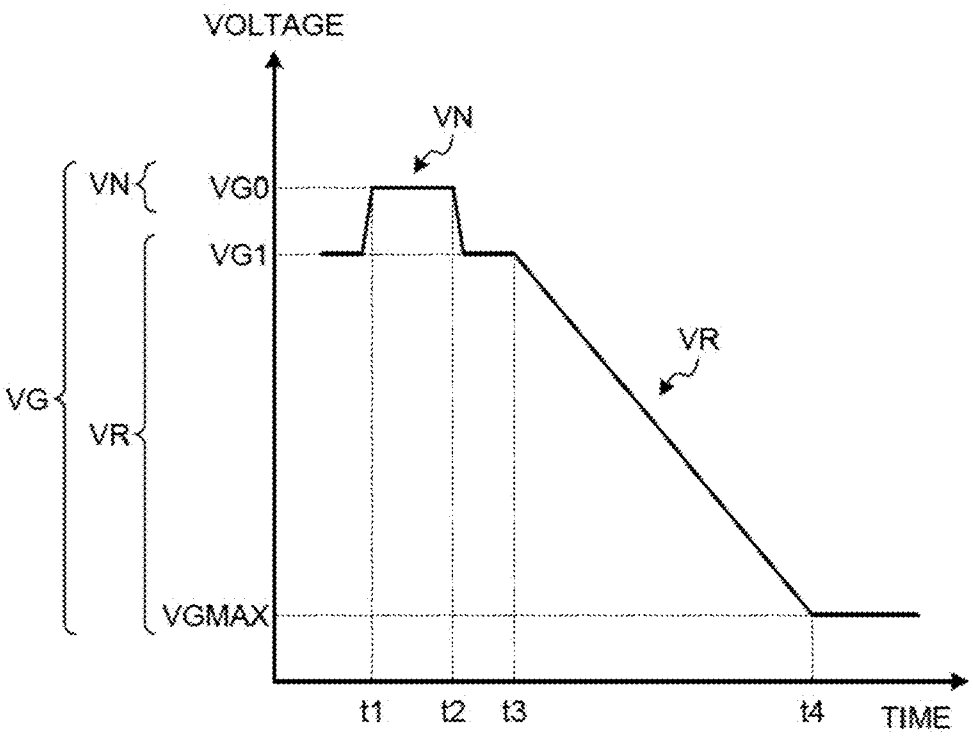
FIG. 4 is a graph illustrating an example of the generated voltage.

FIG. 4 is a graph illustrating an example of the generated voltage. The horizontal axis of the graph represents time, and the vertical axis of the graph represents the magnitude of the generated voltage VG. The generated voltage VG includes a ramp voltage VR and a non-ramp voltage VN. In this example, the non-ramp voltage VN is generated at time outside a generation period of the ramp voltage VR.

The ramp voltage VR linearly changes between the voltage VG1 and the voltage VGMAX with the lapse of time. In this example, the ramp voltage VR is generated from time t3 to time t4, during which the ramp voltage VR decreases linearly from the voltage VG1 to the voltage VGMAX.

The non-ramp voltage VN includes a voltage outside the voltage range of the ramp voltage VR. More specifically, the non-ramp voltage VN includes the voltage VG0, and in this example, non-ramp voltage VN=voltage VG0. The non-ramp voltage VN is generated from time t1 to time t2. That is, the non-ramp voltage VN (=voltage VG0) is continuously generated for a certain period from time t1 to time t2.

In the example illustrated in FIG. 4, a certain interval is provided between time t2 and time t3. The non-ramp voltage VN is generated at time separated from the generation period of the ramp voltage VR on the time axis. The length of the separation in time may be equal to or longer than a delay time of the control of the gradation voltage SG of a pixel 211 farthest from the H-DRV 23 with respect to the control of the gradation voltage SG of a pixel 211 closest to the H-DRV 23 among the plurality of pixels 211.

Returning to FIG. 3, the gradation voltage SG of each of the plurality of pixels 211 is obtained from, for example, the generated voltage VG including the ramp voltage VR and the non-ramp voltage VN as described above. The H-DRV 23 supplies the gradation voltage SG to each of the plurality of pixels 211 using the generated voltage VG of the voltage generation circuit 25. More specifically, the selector 232 and the counter 233 of the H-DRV 23 control the gradation voltage SG of each of the plurality of pixels 211 by holding a voltage of the generated voltage VG of the voltage generation circuit 25 as of a desired time.

The selector 232 includes a plurality of switches SW corresponding to a plurality of signal lines SL. Each of the plurality of switches SW is connected between a corresponding signal line SL, namely, a corresponding pixel 211, and the buffer circuit 231. On/off timing of each of the switches SW is individually controlled by the counter 233. In this example, on/off of each of the switches SW is controlled via pulse width modulation (PWM) based on a count result of the counter 233.

Describing the generated voltage VG of FIG. 4 described above as an example, before time t1, all the switches SW of the selector 232 are ON (conductive state), and the gradation voltage SG of each of the pixels 211 is the same as the generated voltage VG of the voltage generation circuit 25. Thereafter, a desired switch SW is switched from ON to OFF at desired time, and the gradation voltage SG of a corresponding pixel 211 is held at the generated voltage VG as of the time when the switch SW is turned off. The timing to turn off each of the switches SW is controlled on the basis of a count value of the counter 233.

Specifically, in a case where the gradation voltage SG is controlled to any one of the voltages VG1 to VGMAX, a corresponding switch SW is turned off at any desired time between time t3 and time t4 at which the ramp voltage VR is generated (RAMPDAC control). Meanwhile, in a case where the gradation voltage SG is controlled to the voltage VG0, a corresponding switch SW is turned off at any desired time between time t1 and time t2 at which the non-ramp voltage VN is generated, for example, time in between time t1 and time t2. Note that, as the non-ramp voltage VN continues to be generated over a certain period from time t1 to time t2, the timing of turning off the switch SW may vary, and the gradation voltage SG corresponding to the non-ramp voltage VN (for example, the voltage VG0) becomes more likely to be obtained.

For example, as described above, the gradation voltage SG of each of the plurality of pixels 211 is controlled using the generated voltage VG of the voltage generation circuit 25. In the present embodiment, the voltage range of the ramp voltage VR is allocated to the voltages VG1 to VGMAX excluding the voltage VG0, for example, in equal division. As a result, the gradation resolution can be improved as compared with a case where the voltage range of the ramp voltage VR is allocated to the voltages VG0 to VGMAX. By simply linearly and equally dividing the voltages VG1 to VGMAX corresponding to the gradation voltage SG, it is also possible to suppress power consumption or design cost required for processing.

In addition, since the non-ramp voltage VN including the voltage VG0 corresponding to the 0 gradation voltage is generated separately from the ramp voltage VR, it is possible to reliably obtain the gradation voltage SG that minimizes the luminance of a pixel 211. This makes it possible to suppress a reduction in the contrast.

Therefore, it is possible to achieve both improvement in gradation characteristics and suppression of a reduction in the contrast.

Note that performing similar control is performed using only the ramp voltage may result in disadvantages as the following. That is, pixels 211 corresponding to the same display line in the vertical direction have different distances from the H-DRV 23. Among these pixels 211, control of the gradation voltage VG is delayed. The longest delay is a delay in the control of the gradation voltage SG of a pixel 211 farthest from the H-DRV 23 with respect to the control of the gradation voltage SG of a pixel 211 closest to the H-DRV 23. Due to the delay, an actual voltage level varies among the pixels 211 when it is attempted to control the gradation voltage SG to the voltage VG0. This will be described with reference to FIG. 5.

Figure 5:
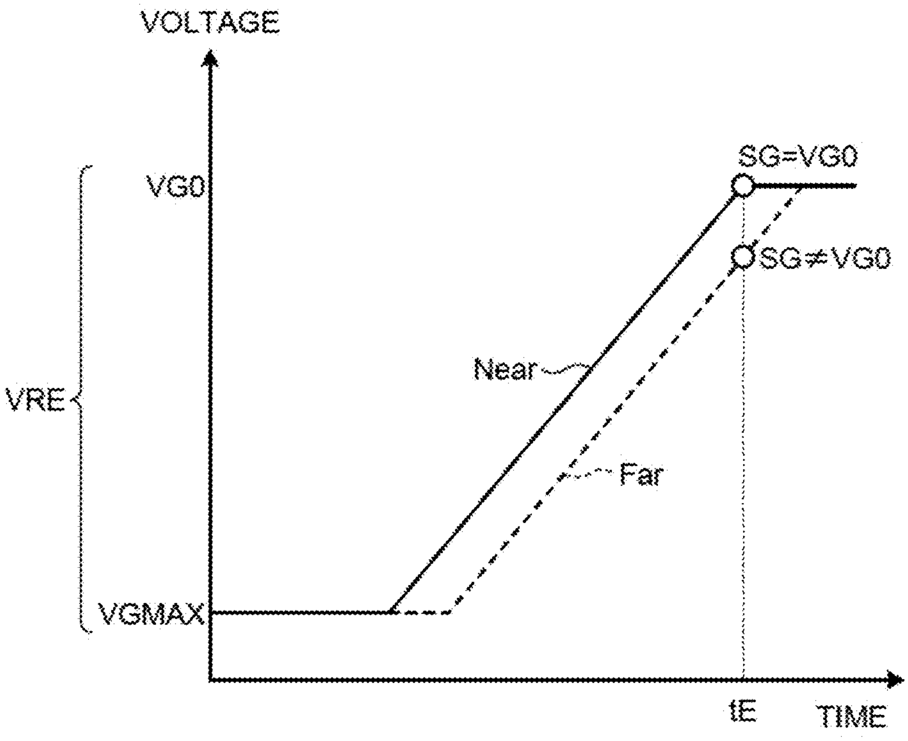
FIG. 5 is a graph illustrating a comparative example.

FIG. 5 is a diagram illustrating a comparative example. A line Near indicates the gradation voltage SG of the pixel 211 closest to the H-DRV 23. A line Far indicates the gradation voltage SG of the pixel 211 farthest from the H-DRV 23. A ramp voltage of the comparative example is referred to as a ramp voltage VRE in the drawing. In this example, the ramp voltage VRE rises linearly from the voltage VGMAX to the voltage VG0. As is understood, the voltage change indicated by the line Far is delayed from the voltage change indicated by the line Near.

The ramp voltage VRE at time tE is held as the gradation voltage SG that minimizes the luminance of a pixel 211. As indicated by the line Near, the gradation voltage SG of the pixel 211 closest to the H-DRV 23 is the same as the voltage VG0. Meanwhile, as indicated by the line Far, the gradation voltage SG of the pixel 211 farthest from the H-DRV 23 is shifted toward the voltage VGMAX side from the voltage VG0. The pixel 211 emits light with luminance higher than the lowest luminance. As a result, the contrast in some pixels 211 decreases.

Meanwhile, in the present embodiment, the gradation voltage SG of a pixel 211 is controlled to the voltage VG0 using the non-ramp voltage VN generated separately from the ramp voltage VR. By using the non-ramp voltage VN at timing not affected by the above-described delay, the gradation voltage SG of any pixel 211 can be reliably controlled to the voltage VG0. As a result, it is possible to suppress a reduction in the contrast that may occur in some pixels 211 away from the H-DRV 23.

Improvement of gradation characteristics will be further described. In particular, it is effective that the voltage VG0 corresponding to the gradation voltage SG for minimizing the luminance of a pixel 211 be excluded from the voltage range of the ramp voltage VR and included in the voltage VG. This will be described also with reference to FIG. 6.

Figure 6:
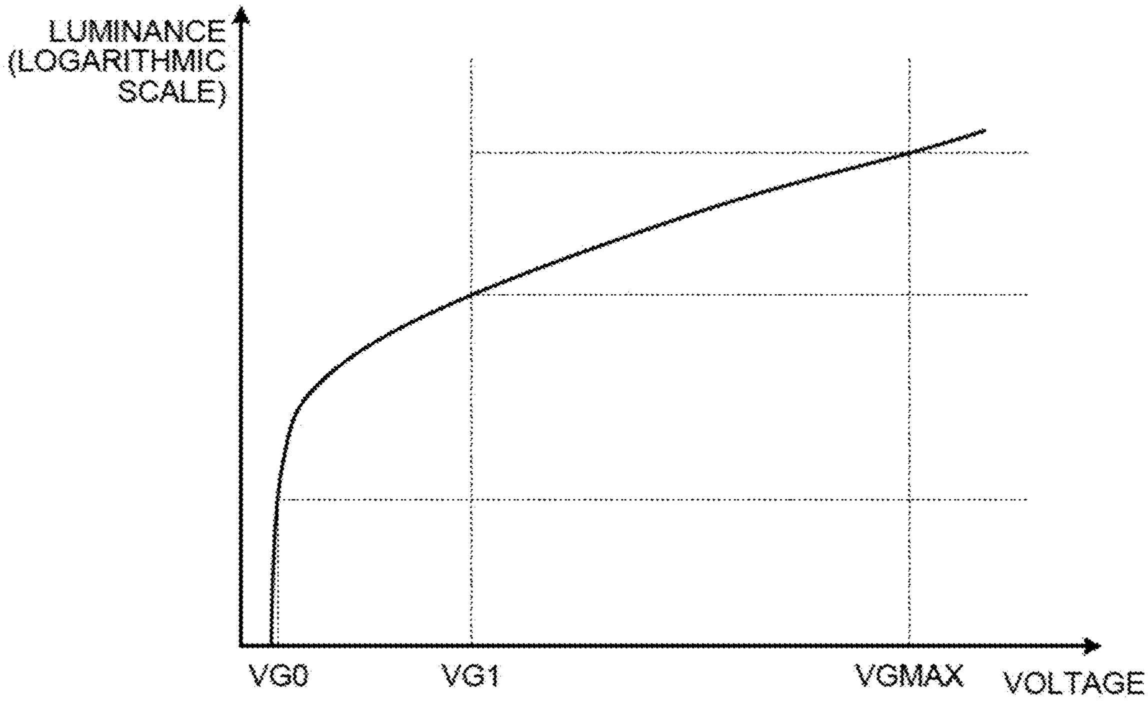
FIG. 6 is a graph for explaining gradation characteristics.

FIG. 6 is a graph for explaining gradation characteristics. The horizontal axis of the graph represents the voltage, and the vertical axis of the graph represents the luminance (logarithmic scale). As can be understood, the voltage VG0 is significantly separated from the voltages VG1 to VGMAX. By simply removing the voltage VG0 from the voltage range of the ramp voltage VR, the gradation characteristics can be significantly improved. As an example, in a case where the voltage VG0 to the voltage VGMAX include voltages of 1024 stages, the ratio of a voltage range of the voltage VG0 to the voltage VG1 to a voltage range of the voltage VG0 to the voltage VGMAX is up to about 20%. By removing the voltage VG0 from the voltage range of the ramp voltage VR and allocating the voltage VG1 to the voltage VGMAX, the resolution of gradation can be improved about 1.25 times.

2. MODIFICATIONS

The technology disclosed is not limited to the above embodiments. The non-ramp voltage VN may include not only the voltage VG0 but also a voltage having a higher gradation than the voltage VG0, for example, the voltage VG1. Generally describing, in a case where N is an integer equal to or greater than 1, the non-ramp voltage VN may include the voltage VG0 to a voltage VGN, and the ramp voltage VR may include a voltage VGN+1 to the voltage VGMAX. The voltage VG1 and the voltage VGN may be read interchangeably as appropriate as long as there is no inconsistency.

In one embodiment, the ramp voltage VR may rise linearly over time. In addition, the non-ramp voltage VN may be generated at time later than the generation time of the ramp voltage VR. Various combinations of the ramp voltage VR and the non-ramp voltage VN can be made. Some specific examples will be described with reference to FIGS. 7 to 10.

FIGS. 7 to 10 are graphs illustrating exemplary combinations of the ramp voltage and the non-ramp voltage.

Figure 7:
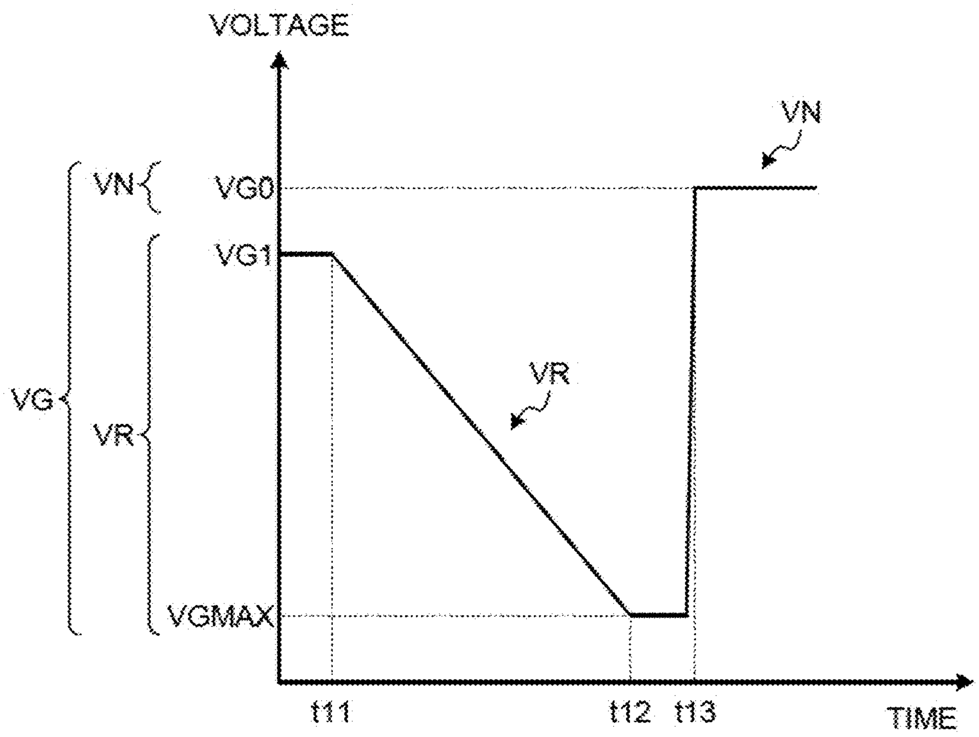
FIG. 7 is a graph illustrating an exemplary combination of the ramp voltage and the non-ramp voltage.

In an example illustrated in FIG. 7, the ramp voltage VR is generated from time t11 to time t12. The ramp voltage VR linearly decreases from the voltage VG1 to the voltage VGMAX. In a certain period from time t13, the non-ramp voltage VN is generated. The length of the certain period may be, for example, the same as the length of the period from time t1 to time t2 in FIG. 4 described above.

Figure 8:
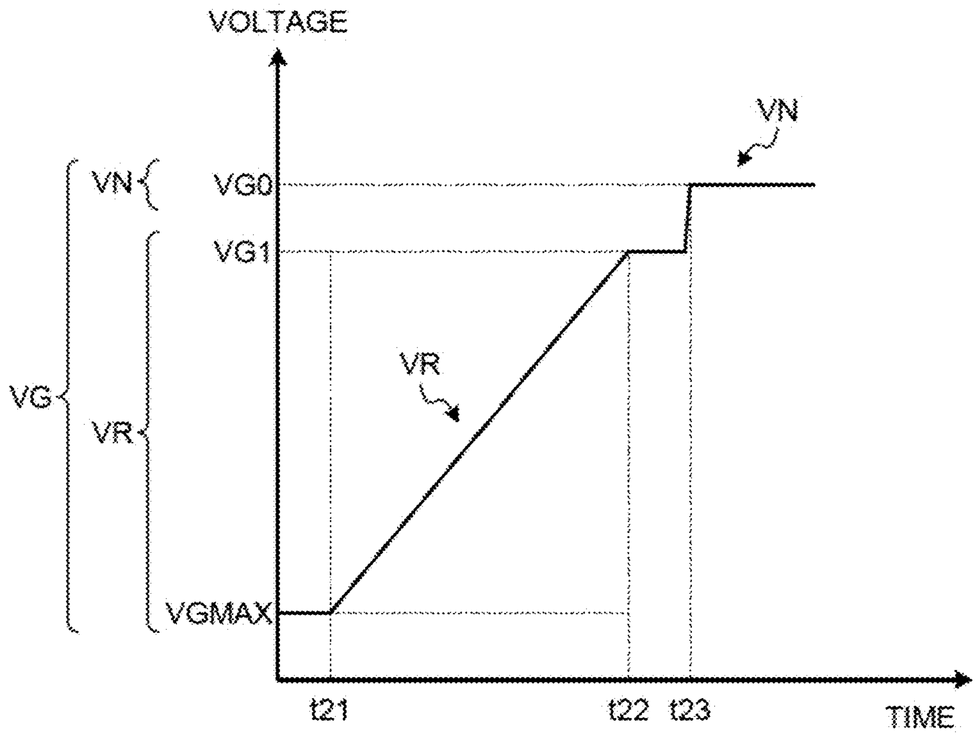
FIG. 8 is a graph illustrating an exemplary combination of the ramp voltage and the non-ramp voltage.

In the example illustrated in FIG. 8, the ramp voltage VR is generated from time t21 to time t22. The ramp voltage VR linearly increases from the voltage VGMAX to the voltage VG1. In a certain period from time t23, the non-ramp voltage VN is generated.

Figure 9:
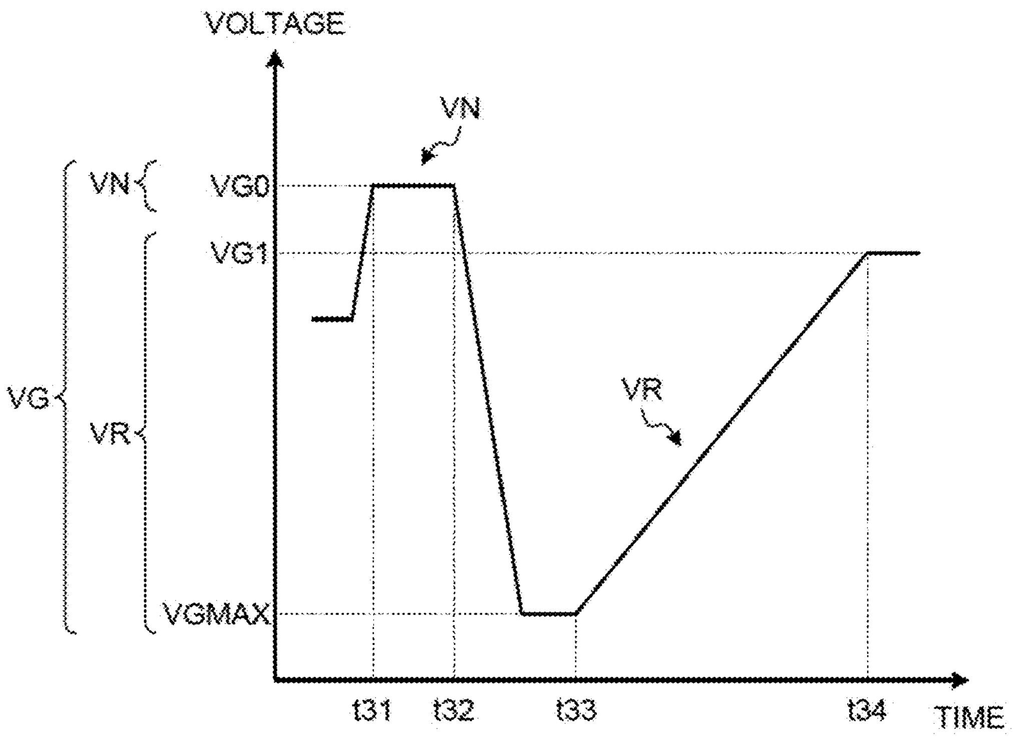
FIG. 9 is a graph illustrating an exemplary combination of the ramp voltage and the non-ramp voltage.

In the example illustrated in FIG. 9, the non-ramp voltage VN is generated in a certain period from time t31 to time t32. From time t33 to time t34, the ramp voltage VR is generated. The ramp voltage VR linearly increases from a voltage VG1023 to the voltage VG1.

Figure 10:
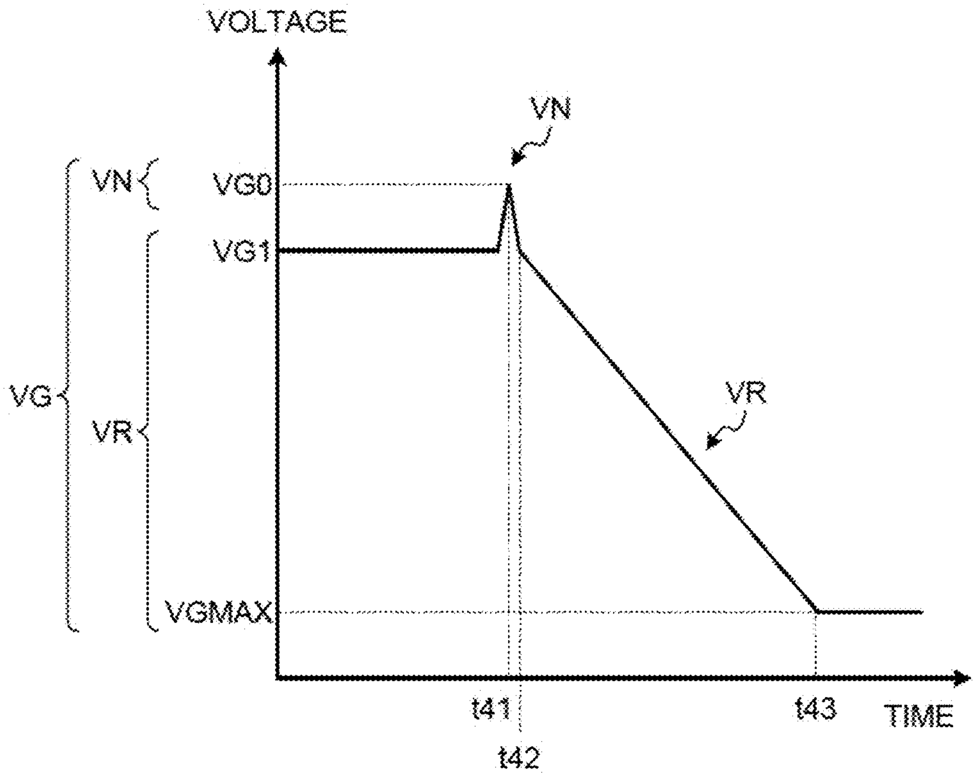
FIG. 10 is a graph illustrating an exemplary combination of the ramp voltage and the non-ramp voltage.

In the example illustrated in FIG. 10, the non-ramp voltage VN is generated at time t41. From time t42 to time t43, the ramp voltage VR is generated. The ramp voltage VR linearly decreases from the voltage VG1 to the voltage VGMAX.

The voltage VG including various the ramp voltages VR and non-ramp voltages VN as described above, for example, may be generated by the voltage generation circuit 25.

In an embodiment, the gradation voltage SG obtained from the ramp voltage VR and the gradation voltage SG obtained from the generated voltage VG may be supplied to a pixel 211 via different routes. An exemplary configuration of such a display device 2 will be described with reference to FIG. 11.

Figure 11:
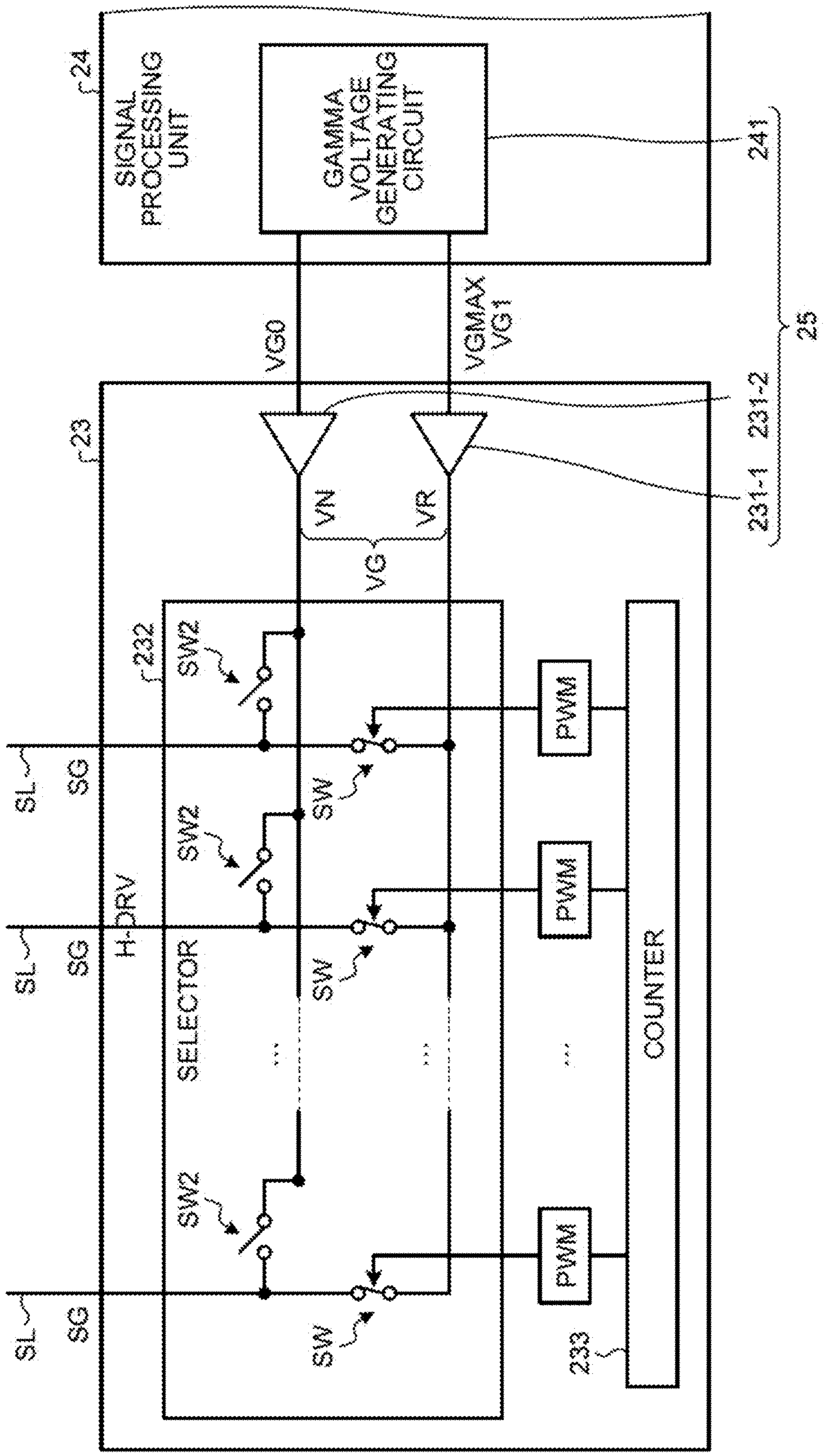
FIG. 11 is a diagram illustrating a modification of the H-DRV and the signal processing unit.

FIG. 11 is a diagram illustrating a modification of the H-DRV and the signal processing unit. The voltage generation circuit 25 (more specifically, the H-DRV 23) includes two buffer circuits 231. The first buffer circuit 231 is referred to as a buffer circuit 231-1 in the drawing. The second buffer circuit 231 is referred to as a buffer circuit 231-2 in the drawing.

Out of the voltage VG0, the voltage VGMAX, and the voltage VG1 generated by the gamma voltage generating circuit 241 of the voltage generation circuit 25, the voltage VG1 and the voltage VGMAX are supplied to the buffer circuit 231-1. The buffer circuit 231-1 generates and outputs the ramp voltage VR that linearly changes between the voltage VG1 and the voltage VGMAX. The voltage VG0 generated by the gamma voltage generating circuit 241 is supplied to the buffer circuit 231-2. The buffer circuit 231-2 generates and outputs the non-ramp voltage VN including the voltage VG0.

Each of the plurality of switches SW of the selector 232 of the signal processing unit 24 described above is connected between a corresponding signal line SL, namely, a corresponding pixel 211 and the buffer circuit 231-1.

The selector 232 also includes a plurality of switches SW2 corresponding to the plurality of signal lines SL. Each of the plurality of switches SW2 is connected between a corresponding signal line SL, namely, a corresponding pixel 211, and the buffer circuit 231-2. ON/OFF of each of the switches SW2 is individually controlled. This control may be performed by the counter 233 or may be performed by another control circuit (not illustrated) or the like.

In a case where the gradation voltage SG of a pixel 211 is controlled using the ramp voltage VR, a switch SW and a switch SW2 corresponding to the pixel 211 are controlled such that the switch SW is turned on and that the switch SW2 is turned off. The gradation voltage SG obtained from the ramp voltage VR is supplied to the pixel 211 via a route including the switch SW.

In a case where the gradation voltage SG of a pixel 211 is controlled using the non-ramp voltage VN, a switch SW and a switch SW2 corresponding to the pixel 211 are controlled such that the switch SW is turned off and that the switch SW2 is turned on. The gradation voltage SG obtained from the non-ramp voltage VN is supplied to the pixel 211 via a route including the switch SW2.

For example, with the above configuration, the gradation voltage SG obtained from the ramp voltage VR and the gradation voltage SG obtained from the generated voltage VG can be supplied to a pixel 211 via different routes.

3. EXEMPLARY EFFECTS

The technology described above is specified as follows, for example. One aspect of the disclosed technology is the display device 2. As described with reference to FIGS. 1 to 4, 7 to 11, and others, the display device 2 includes the voltage generation circuit 25 and the plurality of pixels 211. Each of the plurality of pixels 211 emits light with luminance corresponding to the gradation voltage SG obtained from the generated voltage VG of the voltage generation circuit 25. The generated voltage VG includes the ramp voltage VR and the non-ramp voltage VN including a voltage outside the voltage range of the ramp voltage VR. The non-ramp voltage VN includes the voltage VG0 corresponding to the gradation voltage SG that minimizes the luminance of a pixel 211.

According to the above display device 2, since the voltage range of the ramp voltage VR can be allocated to a voltage other than the voltage VG0, it is possible to improve the gradation characteristics as compared with the case of allocating the voltage range of the ramp voltage VR to a voltage including the voltage VG0. In addition, since the non-ramp voltage VN including the voltage VG0 is generated separately from the ramp voltage VR, it is possible to reliably obtain the gradation voltage SG that minimizes the luminance of a pixel 211. This makes it possible to suppress a reduction in the contrast. Therefore, it is possible to achieve both improvement in gradation characteristics and suppression of a reduction in the contrast.

As described with reference to FIGS. 4, 7 to 10, and others, the non-ramp voltage VN is the voltage VG0 corresponding to the gradation voltage SG that minimizes the luminance of a pixel 211, and the ramp voltage VR may linearly change between the voltage VG1 corresponding to the gradation voltage SG that makes the luminance of a pixel 211 the second lowest and the voltage VMAX corresponding to the gradation voltage SG that maximizes the luminance of a pixel 211. The gradation voltage SG of a pixel 211 can be obtained from, for example, the generated voltage VG including the ramp voltage VR and the non-ramp voltage VN as described above.

As described with reference to FIGS. 4 and 7 to 10 and others, the voltage generation circuit 25 may generate the non-ramp voltage VN at time (for example, from time 1 to time t2 in FIG. 4) outside the generation period of the ramp voltage VR (for example, from time t3 to time t4 in FIG. 4). The display device 2 may include the H-DRV 23 that controls the gradation voltage SG of each of the plurality of pixels 211 by holding the voltage of the generated voltage VG as of desired time. For example, with such a configuration, the gradation voltage SG can be obtained from the generated voltage VG.

As described with reference to FIGS. 4 and 7 to 9 and others, the voltage generation circuit 25 may generate the non-ramp voltage VN at time separated from the generation period of the ramp voltage VR (for example, from time t3 to time t4 in FIG. 4) on the time axis (for example, from time t1 to time 2 in FIG. 4). The length of the separation in time in this case may be equal to or longer than the delay time of the control of the gradation voltage SG of the pixel 211 farthest from the H-DRV 23 with respect to the control of the gradation voltage SG of the pixel 211 closest to the H-DRV 23 among the plurality of pixels 211. As a result, the gradation voltage SG of each of the pixels 211 can be controlled to a voltage (for example, the voltage VG0) corresponding to the non-ramp voltage VN by using the non-ramp voltage VN so as not to be affected by a control delay of the gradation voltage SG that may occur among the pixels 211. As a result, it is possible to suppress a reduction in the contrast that may occur in some pixels 211 away from the H-DRV 23.

As described with reference to FIGS. 4 and 7 to 9 and the like, the voltage generation circuit 25 may continue to generate the non-ramp voltage VN for a certain period (for example, from time t1 to time t2 in FIG. 4). Accordingly, the gradation voltage SG corresponding to the non-ramp voltage VN is easily obtained.

As described with reference to FIG. 11 and others, among gradation voltages SG obtained from the generated voltage VG, the gradation voltage SG obtained from the ramp voltage VR and the gradation voltage SG obtained from the non-ramp voltage VN may be supplied to the pixels 211 via different routes. For example, the voltage generation circuit 25 may include the first buffer circuit 231-1 that outputs the ramp voltage VR and the second buffer circuit 231-2 that outputs the non-ramp voltage VN. The display device 2 may include the plurality of switches SW each connected between a corresponding pixel 211 and the first buffer circuit 231-1 and the plurality of switches SW2 each connected between a corresponding pixel 211 and the second buffer circuit 231-2. For example, in this manner, the gradation voltage SG of a pixel 211 can be controlled using the ramp voltage VR and the non-ramp voltage VN obtained from different routes (different nodes).

Note that the above-described effects are examples. There may be other effects.

4. EXAMPLES OF PIXEL CIRCUIT

Some examples of the pixel circuit will be described with reference to FIGS. 12 to 19. In these drawings, a pixel is indicated as a pixel PIX. A control line from the V-DRV 22 is illustrated as a control line WSL, DSL, or the like. A signal line from the H-DRV 23 is indicated as a signal line SGL or the like.

Figure 12:
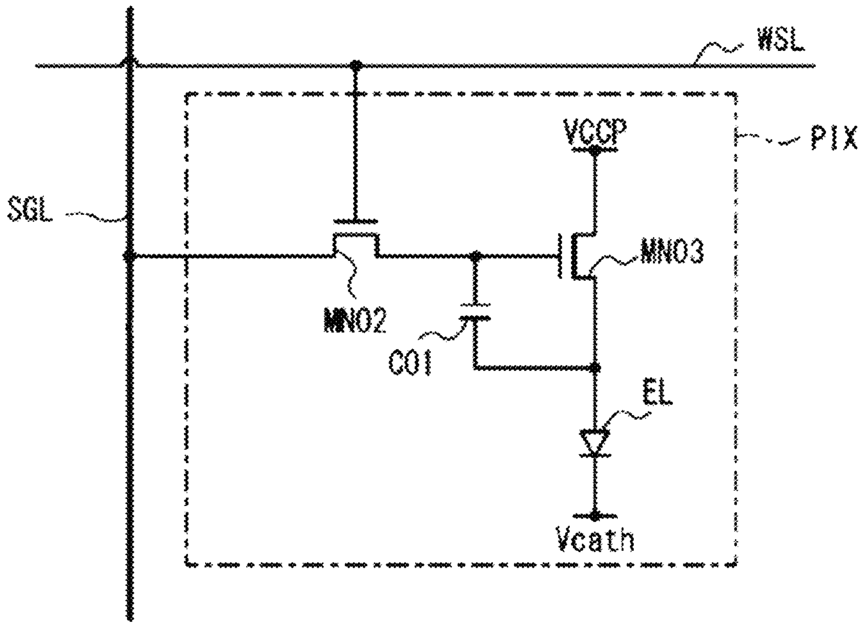
FIG. 12 is a diagram illustrating a configuration example of a pixel PIX.

FIG. 12 is a diagram illustrating a configuration example of a pixel PIX. The pixel PIX includes a capacitor C01, transistors MN02 to MN03, and a light emitting element EL. The transistors MN02 to MN03 are N-type metal oxide semiconductor field effect transistors (MOSFETs). The gate of the transistor MN02 is connected to a control line WSL, the drain thereof is connected to a signal line SGL, and the source thereof is connected to the gate of the transistor MN03 and the capacitor C01. One end of the capacitor C01 is connected to the source of the transistor MN02 and the gate of the transistor MN03, and the other end is connected to the source of the transistor MN03 and the anode of the light emitting element EL. The gate of the transistor MN03 is connected to the source of the transistor MN02 and the one end of the capacitor C01, the drain thereof is connected to a power supply line VCCP, and the source thereof is connected to the other end of the capacitor C01 and the anode of the light emitting element EL. The light emitting element EL is, for example, an organic EL light emitting element, the anode is connected to the source of the transistor MN03 and the other end of the capacitor C01, and the cathode is connected to a power supply line Vcath.

With this configuration, in the pixel PIX, when the transistor MN02 is turned on, a voltage across the capacitor C01 is set on the basis of a pixel signal supplied from the signal line SGL. The transistor MN03 causes a current corresponding to the voltage across the capacitor C01 to flow through the light emitting element EL. The light emitting element EL emits light on the basis of the current supplied from the transistor MN03. In this manner, the pixel PIX emits light with luminance corresponding to the pixel signal.

Figure 13:
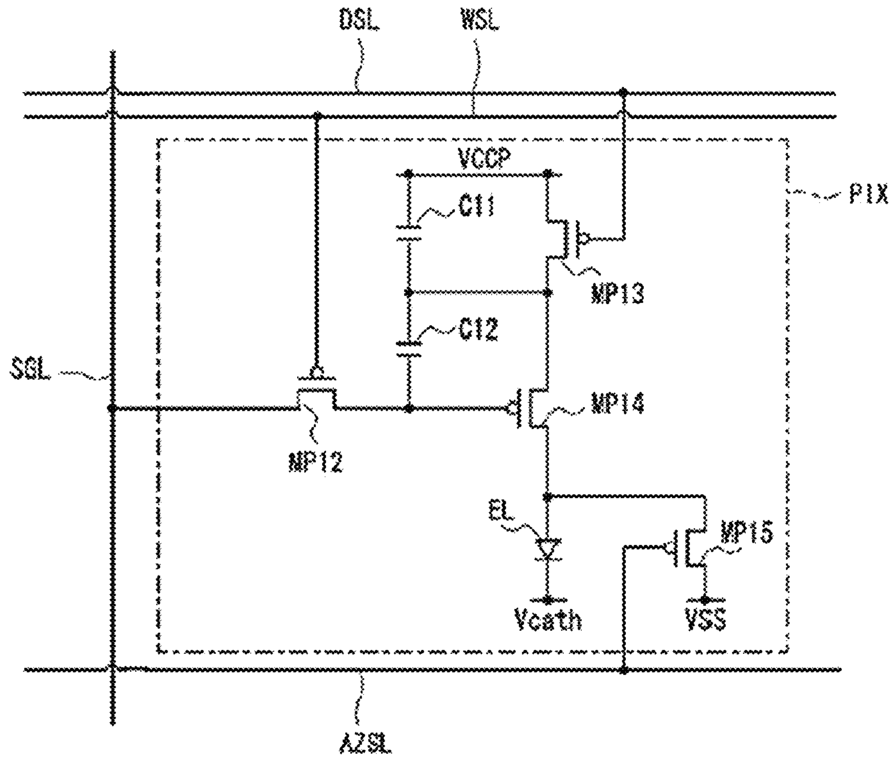
FIG. 13 is a diagram illustrating another configuration example of a pixel PIX.

FIG. 13 is a diagram illustrating another configuration example of a pixel PIX. The pixel PIX includes capacitors C11 and C12, transistors MP12 to MP15, and a light emitting element EL. The transistors MP12 to MP15 are P-type MOSFETS. The gate of the transistor MP12 is connected to a control line WSL, the source thereof is connected to a signal line SGL, and the drain thereof is connected to the gate of the transistor MP14 and the capacitor C12. One end of the capacitor C11 is connected to a power supply line VCCP, and the other end is connected to the capacitor C12, the drain of the transistor MP13, and the source of the transistor MP14. One end of the capacitor C12 is connected to the other end of the capacitor C11, the drain of the transistor MP13, and the source of the transistor MP14, and the other end is connected to the drain of the transistor MP12 and the gate of the transistor MP14. The gate of the transistor MP13 is connected to a control line DSL, the source thereof is connected to a power supply line VCCP, and the drain thereof is connected to the source of the transistor MP14, the other end of the capacitor C11, and the one end of the capacitor C12. The gate of the transistor MP14 is connected to the drain of the transistor MP12 and the other end of the capacitor C12, the source thereof is connected to the drain of the transistor MP13, the other end of the capacitor C11, and the one end of the capacitor C12, and the drain thereof is connected to the anode of the light emitting element EL and the source of the transistor MP15. The gate of the transistor MP15 is connected to a control line AZSL, the source thereof is connected to the drain of the transistor MP14 and the anode of the light emitting element EL, and the drain thereof is connected to a power supply line VSS.

With this configuration, in the pixel PIX, when the transistor MP12 is turned on, a voltage across the capacitor C12 is set on the basis of a pixel signal supplied from the signal line SGL. The transistor MP13 is turned on and off on the basis of a signal of the control line DSL. The transistor MP14 causes a current corresponding to the voltage across the capacitor C12 to flow through the light emitting element EL during a period in which the transistor MP13 is in an ON state. The light emitting element EL emits light on the basis of the current supplied from the transistor MP14. In this manner, the pixel PIX emits light with luminance corresponding to the pixel signal. The transistor MP15 is turned on and off on the basis of a signal of the control line AZSL. During the period in which the transistor MP15 is in the ON state, the voltage of the anode of the light emitting element EL is initialized by being set to the voltage of the power supply line VSS.

Figure 14:
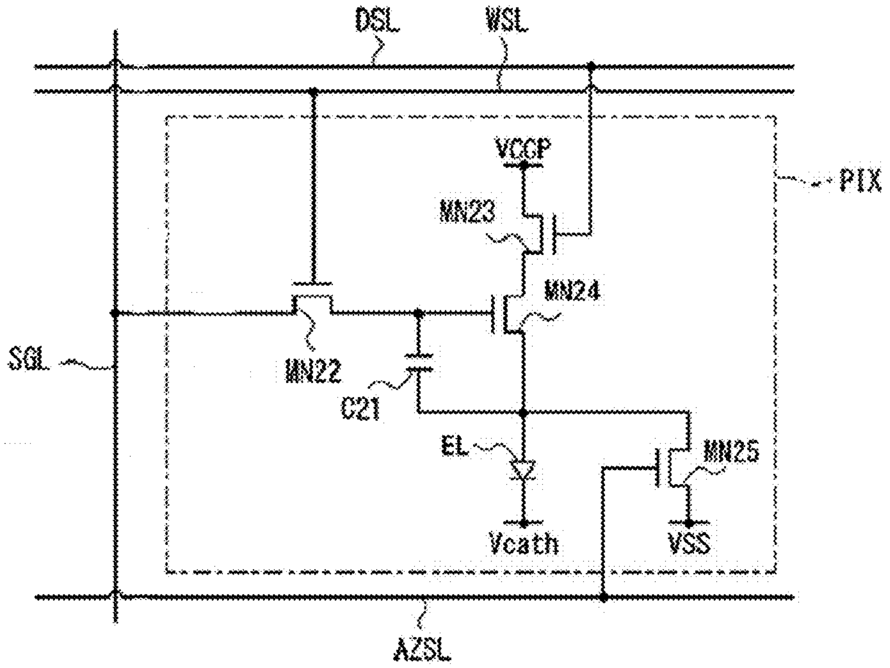
FIG. 14 is a diagram illustrating another configuration example of a pixel PIX.

FIG. 14 is a diagram illustrating another configuration example of a pixel PIX. The pixel PIX includes a capacitor C21, transistors MN22 to MN25, and a light emitting element EL. The transistors MN22 to MN25 are N-type MOSFETs. The gate of the transistor MN22 is connected to a control line WSL, the drain thereof is connected to a signal line SGL, and the source thereof is connected to the gate of the transistor MN24 and the capacitor C21. One end of the capacitor C21 is connected to the source of the transistor MN22 and the gate of the transistor MN24, and the other end is connected to the source of the transistor MN24, the drain of the transistor MN25, and the anode of the light emitting element EL. The gate of the transistor MN23 is connected to a control line DSL, the drain thereof is connected to a power supply line VCCP, and the source thereof is connected to the drain of the transistor MN24. The gate of the transistor MN24 is connected to the source of the transistor MN22 and the one end of the capacitor C21, the drain thereof is connected to the source of the transistor MN23, and the source thereof is connected to the other end of the capacitor C21, the drain of the transistor MN25, and the anode of the light emitting element EL. The gate of the transistor MN25 is connected to a control line AZSL, the drain thereof is connected to the source of the transistor MN24, the other end of the capacitor C21, and the anode of the light emitting element EL, and the source thereof is connected to a power supply line VSS.

With this configuration, in the pixel PIX, when the transistor MN22 is turned on, a voltage across the capacitor C21 is set on the basis of a pixel signal supplied from the signal line SGL. The transistor MN23 is turned on and off on the basis of a signal of the control line DSL. The transistor MN24 causes a current corresponding to the voltage across the capacitor C21 to flow through the light emitting element EL during a period in which the transistor MN23 is in the ON state. The light emitting element EL emits light on the basis of the current supplied from the transistor MN24. In this manner, the pixel PIX emits light with luminance corresponding to the pixel signal. The transistor MN25 is turned on and off on the basis of a signal of the control line AZSL. During the period in which the transistor MN25 is in the ON state, the voltage of the anode of the light emitting element EL is initialized by being set to the voltage of the power supply line VSS.

Figure 15:
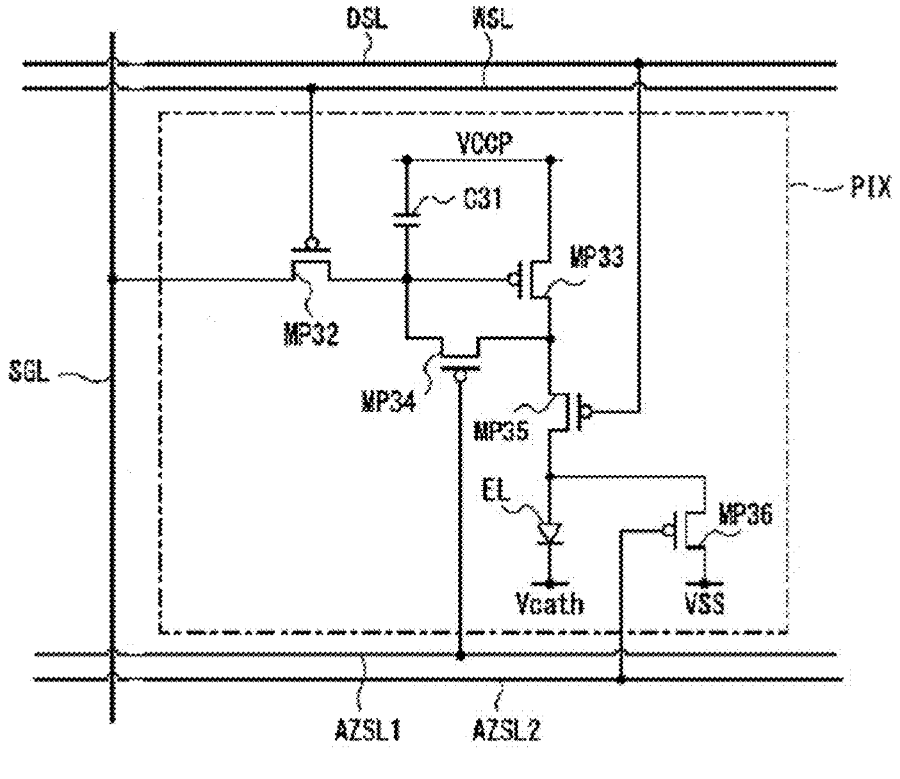
FIG. 15 is a diagram illustrating another configuration example of a pixel PIX.

FIG. 15 is a diagram illustrating another configuration example of a pixel PIX. The pixel PIX includes a capacitor C31, transistors MP32 to MP36, and a light emitting element EL. The transistors MP32 to MP36 are P-type MOSFETs. The gate of the transistor MP32 is connected to a control line WSL, the source thereof is connected to a signal line SGL, and the drain thereof is connected to the gate of the transistor MP33, the drain of the transistor MP34, and the capacitor C31. One end of the capacitor C31 is connected to a power supply line VCCP, and the other end is connected to the drain of the transistor MP32, the gate of the transistor MP33, and the drain of the transistor MP34. The gate of the transistor MP34 is connected to a control line AZSL1, the source thereof is connected to the drain of the transistor MP33 and the source of the transistor MP35, and the drain thereof is connected to the drain of the transistor MP32, the gate of the transistor MP33, and the other end of the capacitor C31. The gate of the transistor MP35 is connected to a control line DSL, the source thereof is connected to the drain of the transistor MP33 and the source of the transistor MP34, and the drain thereof is connected to the source of the transistor MP36 and the anode of the light emitting element EL. The gate of the transistor MP36 is connected to a control line AZSL2, the source thereof is connected to the drain of the transistor MP35 and the anode of the light emitting element EL, and the drain thereof is connected to a power supply line VSS.

With this configuration, in the pixel PIX, when the transistor MP32 is turned on, a voltage across the capacitor C31 is set on the basis of a pixel signal supplied from the signal line SGL. The transistor MP35 is turned on and off on the basis of a signal of the control line DSL. The transistor MP33 causes a current corresponding to the voltage across the capacitor C31 to flow through the light emitting element EL during a period in which the transistor MP35 is in the ON state. The light emitting element EL emits light on the basis of the current supplied from the transistor MP33. In this manner, the pixel PIX emits light with luminance corresponding to the pixel signal. The transistor MP34 is turned on and off on the basis of a signal of the control line AZSL1. The drain and the gate of the transistor MP33 are connected to each other during the period in which the transistor MP34 is in the ON state. The transistor MP36 is turned on and off on the basis of a signal of the control line AZSL2. During the period in which the transistor MP36 is in the ON state, the voltage of the anode of the light emitting element EL is initialized by being set to the voltage of the power supply line VSS.

Figure 16:
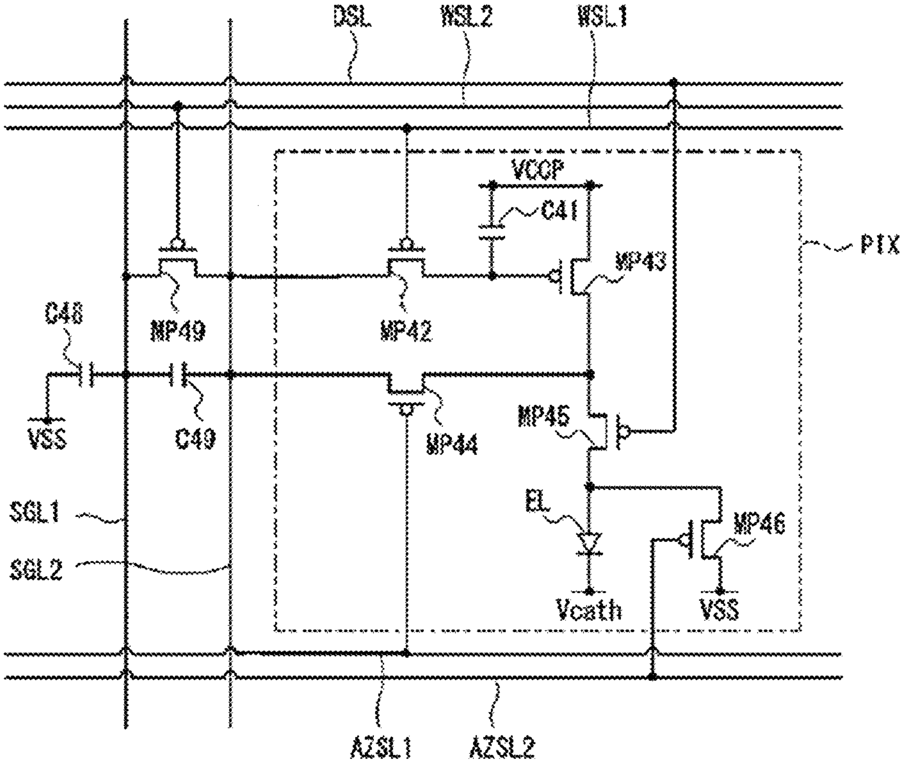
FIG. 16 is a diagram illustrating another configuration example of a pixel PIX.

FIG. 16 is a diagram illustrating another configuration example of a pixel PIX. One end of a capacitor C48 is connected to a signal line SGL1, and the other end is connected to a power supply line VSS. One end of a capacitor C49 is connected to the signal line SGL1, and the other end is connected to a signal line SGL2. A transistor MP49 is a P-type MOSFET, the gate thereof is connected to a control line WSL2, the source thereof is connected to the signal line SGL1, and the drain thereof is connected to the signal line SGL2.

The pixel PIX includes a capacitor C41, transistors MP42 to MP46, and a light emitting element EL. The transistors MP42 to MP46 are P-type MOSFETs. The gate of the transistor MP42 is connected to a control line WSL1, the source thereof is connected to the signal line SGL2, and the drain thereof is connected to the gate of the transistor MP43 and the capacitor C41. One end of the capacitor C41 is connected to the power supply line VCCP, and the other end is connected to the drain of the transistor MP42 and the gate of the transistor MP43. The gate of the transistor MP43 is connected to the drain of the transistor MP42 and the other end of the capacitor C41, the source thereof is connected to the power supply line VCCP, and the drain thereof is connected to the sources of the transistors MP44 and MP45. The gate of the transistor MP44 is connected to a control line AZSL1, the source thereof is connected to the drain of the transistor MP43 and the source of the transistor MP45, and the drain thereof is connected to the signal line SGL2. The gate of the transistor MP45 is connected to a control line DSL, the source thereof is connected to the drain of the transistor MP43 and the source of the transistor MP44, and the drain thereof is connected to the source of the transistor MP46 and the anode of the light emitting element EL. The gate of the transistor MP46 is connected to a control line AZSL2, the source thereof is connected to the drain of the transistor MP45 and the anode of the light emitting element EL, and the drain thereof is connected to the power supply line VSS.

With this configuration, in the pixel PIX, when the transistor MP42 is turned on, a voltage across the capacitor C41 is set on the basis of a pixel signal supplied from the signal line SGL1 via the capacitor C49. The transistor MP45 is turned on and off on the basis of a signal of the control line DSL. The transistor MP43 causes a current corresponding to the voltage across the capacitor C41 to flow through the light emitting element EL during a period in which the transistor MP45 is in the ON state. The light emitting element EL emits light on the basis of the current supplied from the transistor MP43. In this manner, the pixel PIX emits light with luminance corresponding to the pixel signal. The transistor MP44 is turned on and off on the basis of a signal of the control line AZSL1. In the period in which the transistor MP44 is in the ON state, the drain of the transistor MP43 and the signal line SGL2 are connected to each other. The transistor MP46 is turned on and off on the basis of a signal of the control line AZSL2. During the period in which the transistor MP46 is in the ON state, the voltage of the anode of the light emitting element EL is initialized by being set to the voltage of the power supply line VSS.

Figure 17:
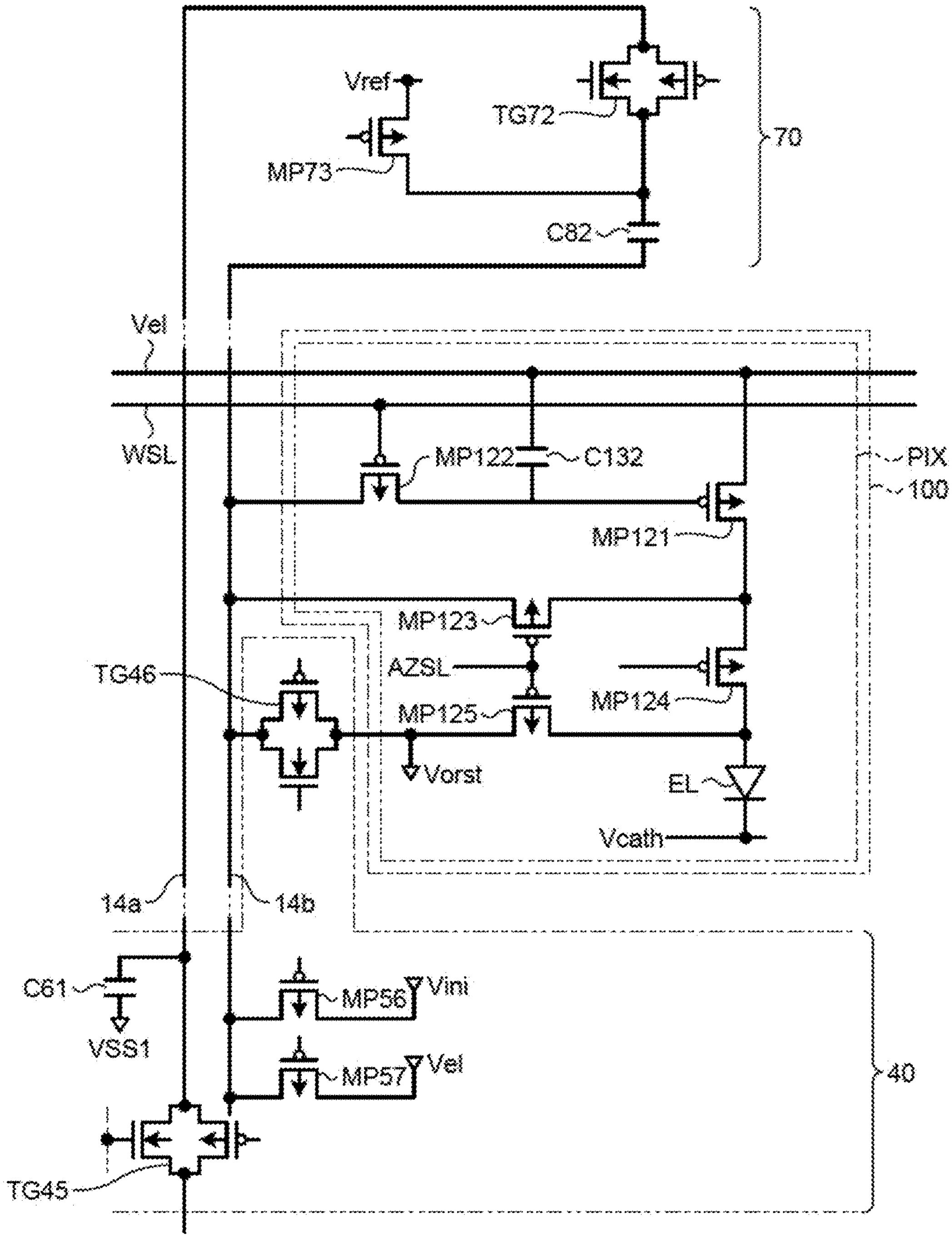
FIG. 17 is a diagram illustrating another configuration example of a pixel PIX.

FIG. 17 is a diagram illustrating another configuration example of a pixel PIX. A plurality of pixels PIX is included in a matrix shape in a display area 100, and the display area 100 is provided between a first control unit 40 and a second control unit 70.

The first control unit 40 includes transmission gates TG45 and TG46, transistors MP56 and MP57, and a capacitor C61. The transistors MP56 and MP57 are P-type MOSFETs. A pixel signal is supplied to an input end of the transmission gate TG45, and an output end of the transmission gate TG45 is connected to one end of a signal line 14*a*. An input end of the transmission gate TG46 is connected to a signal line 14*b*, and an output end of the transmission gate TG46 is connected to a power supply line Vorst. One end of the capacitor C61 is connected to the signal line 14*a*, and the other end is connected to a power supply line VSS1. The gate of the transistor MP56 is connected to a control line, the source thereof is connected to a power supply line Vini, and the drain thereof is connected to the signal line 14*b*. The gate of the transistor MP57 is connected to a control line, the source thereof is connected to a power supply line Vel, and the drain thereof is connected to the signal line 14*b*.

The second control unit 70 includes a transmission gate TG72, a transistor MP73, and a capacitor C82. The transistor MP73 is a P-type MOSFET. An input end of the transmission gate TG72 is connected to the other end of the signal line 14*a*, and an output end is connected to the drain of the transistor MP73 and one end of the capacitor C82. The gate of the transistor MP73 is connected to a control line, the source thereof is connected to a power supply line Vref, and the drain thereof is connected to the output end of the transmission gate MP72 and the one end of the capacitor C82. The one end of the capacitor C82 is connected to the output end of the transmission gate TG72 and the drain of the transistor MP73, and the other end is connected to one end of the signal line 14*b*.

The pixel PIX includes a capacitor C132, transistors MP121 to MP125, and a light emitting element EL. The transistors MP121 to MP125 are P-type MOSFETS. The gate of the transistor MP122 is connected to a control line WSL, the source thereof is connected to the signal line 14*b*, and the drain thereof is connected to the gate of the transistor MP121 and the capacitor C132. One end of the capacitor C132 is connected to the power supply line Vel, and the other end is connected to the drain of the transistor MP122 and the gate of the transistor MP121. The gate of the transistor MP121 is connected to the drain of the transistor MP122 and the other end of the capacitor C132, the source thereof is connected to the power supply line Vel, and the drain thereof is connected to the sources of the transistors MP123 and MP124. The gate of the transistor MP123 is connected to a control line AZSL, the source thereof is connected to the drain of the transistor MP121 and the source of the transistor MP124, and the drain thereof is connected to the signal line 14*b*. The gate of the transistor MP124 is connected to the control line, the source thereof is connected to the drain of the transistor MP121 and the source of the transistor MP123, and the drain thereof is connected to the drain of the transistor MP125 and the anode of the light emitting element EL. The gate of the transistor MP125 is connected to the control line AZSL, the source thereof is connected to the power supply line Vorst, and the drain thereof is connected to the drain of the transistor MP124 and the anode of the light emitting element EL.

With this configuration, in the pixel PIX, when the transistor MP122 is turned on, a voltage across the capacitor C132 is set on the basis of a pixel signal supplied via the transmission gate TG45, the signal line 14*a*, the transmission gate TG72, the capacitor C82, and the signal line 14*b*. The transistor MP124 is turned on and off on the basis of a signal of the control line. The transistor MP121 causes a current corresponding to the voltage across the capacitor C132 to flow through the light emitting element EL during a period in which the transistor MP124 is in the ON state. The light emitting element EL emits light on the basis of the current supplied from the transistor MP121. In this manner, the pixel PIX emits light with luminance corresponding to the pixel signal. The transistors MP123 and MP125 are turned on and off on the basis of a signal of the control line AZSL. In the period in which the transistor MP123 is in the ON state, the drain of the transistor MP121 and the source of the transistor MP124 are connected to the signal line 14*b*. During the period in which the transistor MP125 is in the ON state, the voltage of the anode of the light emitting element EL is initialized by being set to the voltage of the power supply line Vorst. Furthermore, the transistor MP56 is turned on and off on the basis of a signal of the control line, the transistor MP57 is turned on and off on the basis of a signal of the control line, and the transistor MP73 is turned on and off on the basis of a signal of the control line. When the transistor MP56 is turned on, the signal line 14*b* is set to the voltage of the power supply line Vini, and when the transistor MP57 is turned on, the signal line 14*b* is set to the voltage of the power supply line Vel. When the transistor MP73 is turned on, the one end of the capacitor C82 is initialized by being set to the voltage of the power supply line Vref.

Figure 18:
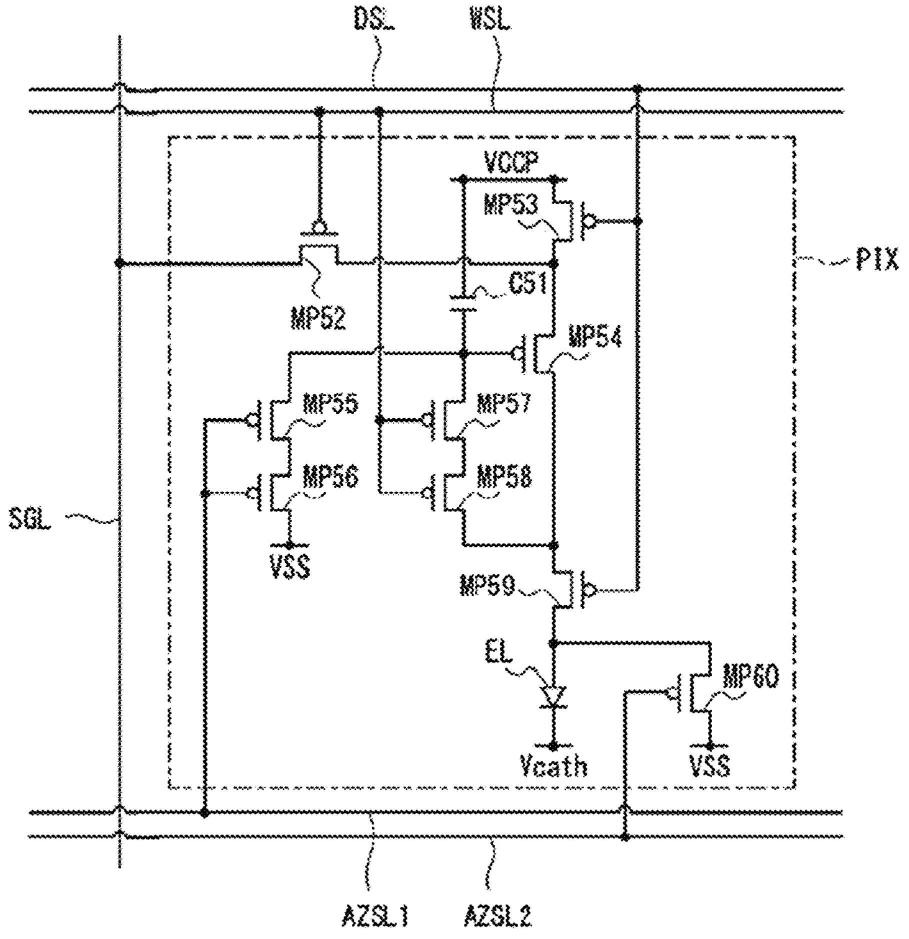
FIG. 18 is a diagram illustrating another configuration example of a pixel FIX.

FIG. 18 is a diagram illustrating another configuration example of a pixel FIX. The pixel PIX includes a capacitor C51, transistors MP52 to MP60, and a light emitting element EL. The transistors MP52 to MP60 are P-type MOSFETs. The gate of the transistor MP52 is connected to a control line WSL, the source thereof is connected to a signal line SGL, and the drain thereof is connected to the drain of the transistor MP53 and the source of the transistor MP54. The gate of the transistor MP53 is connected to a control line DSL, the source thereof is connected to a power supply line VCCP, and the drain thereof is connected to the drain of the transistor MP52 and the source of the transistor MP54. The gate of the transistor MP54 is connected to the source of the transistor MP55, the drain of the transistor MP57, and the capacitor C51, the source thereof is connected to the drains of the transistors MP52 and MP53, and the drain thereof is connected to the sources of the transistors MP58 and MP59. One end of the capacitor C51 is connected to the power supply line VCCP, and the other end is connected to the gate of the transistor MP54, the source of the transistor MP55, and the drain of the transistor MP57. The capacitor C51 may include two capacitors connected in parallel to each other. The gate of the transistor MP55 is connected to a control line AZSL1, the source thereof is connected to the gate of the transistor MP54, the drain of the transistor MP57, and the other end of the capacitor C51, and the drain thereof is connected to the source of the transistor MP56. The gate of the transistor MP56 is connected to the control line AZSL1, the source thereof is connected to the drain of the transistor MP55, and the drain thereof is connected to the power supply line VSS. The gate of the transistor MP57 is connected to the control line WSL, the drain thereof is connected to the gate of the transistor MP54, the source of the transistor MP55, and the other end of the capacitor C51, and the source thereof is connected to the drain of the transistor MP58. The gate of the transistor MP58 is connected to the control line WSL, the drain thereof is connected to the source of the transistor MP57, and the source thereof is connected to the drain of the transistor MB54 and the source of the transistor MP59. The gate of the transistor 59 is connected to the control line DSL, the source thereof is connected to the drain of the transistor MP54 and the source of the transistor MP58, and the drain thereof is connected to the source of the transistor MP60 and the anode of the light emitting element EL. The gate of the transistor MP60 is connected to a control line AZSL2, the source thereof is connected to the drain of the transistor MP59 and the anode of the light emitting element EL, and the drain thereof is connected to the power supply line VSS.

With this configuration, in the pixel PIX, when the transistors MP52, MP54, MP58, and MP57 are turned on, a voltage across the capacitor C51 is set on the basis of a pixel signal supplied from the signal line SGL. The transistors MP53 and MP59 are turned on and off on the basis of a signal of the control line DSL. The transistor MP54 causes a current corresponding to the voltage across the capacitor C51 to flow through the light emitting element EL during a period in which the transistors MP53 and MP59 are in the ON state. The light emitting element EL emits light on the basis of the current supplied from the transistor MP54. In this manner, the pixel PIX emits light with luminance corresponding to the pixel signal. The transistors MP55 and MP56 are turned on and off on the basis of a signal of the control line AZSL1. During the period in which the transistors MP55 and MP56 are in the ON state, the voltage of the gate of the transistor MP54 is initialized by being set to the voltage of the power supply line VSS. The transistor MP60 is turned on and off on the basis of a signal of the control line AZSL2. During the period in which the transistor MP60 is in the ON state, the voltage of the anode of the light emitting element EL is initialized by being set to the voltage of the power supply line VSS.

Figure 19:
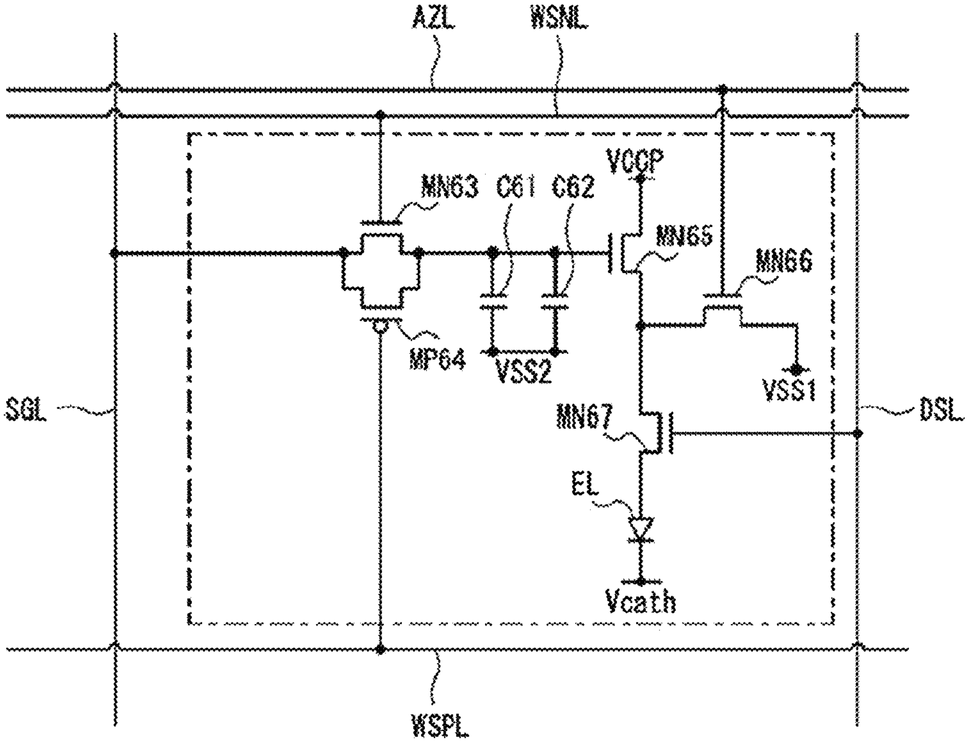
FIG. 19 is a diagram illustrating another configuration example of a pixel PIX.

FIG. 19 is a diagram illustrating another configuration example of a pixel PIX. A signal of a control line WSNL and a signal of a control line WSPL are inverted from one another.

The pixel PIX includes capacitors C61 and C62, transistors MN63, MP64, and MN65 to MN67, and a light emitting element EL. The transistors MN63 and MN65 to MN67 are N-type MOSFETs, and the transistor MP64 is a P-type MOSFET. The gate of the transistor MN63 is connected to the control line WSNL, the drain thereof is connected to a signal line SGL and the source of the transistor MP64, and the source thereof is connected to the drain of the transistor MP64, the capacitors C61 and C62, and the gate of the transistor MN65. The gate of the transistor MP64 is connected to the control line WSPL, the source thereof is connected to the signal line SGL and the drain of the transistor MN63, and the drain thereof is connected to the source of the transistor MN63, the capacitors C61 and C62, and the gate of the transistor MN65. The capacitor C61 includes, for example, a metal oxide metal (MOM) capacitor, one end thereof is connected to the source of the transistor MN63, the drain of the transistor MP64, the capacitor C62, and the gate of the transistor MN65, and the other end thereof is connected to a power supply line VSS2. Note that the capacitor C61 may include, for example, a MOS capacitor or a metal insulator metal (MIM) capacitor. The capacitor C62 includes, for example, a MOS capacitor, one end thereof is connected to the source of the transistor MN63, the drain of the transistor MP64, the one end of the capacitor C61, and the gate of the transistor MN65, and the other end thereof is connected to the power supply line VSS2. Note that the capacitor C62 may include, for example, a MOM capacitor or an MIM capacitor. The gate of the transistor MN65 is connected to the source of the transistor MN63, the drain of the transistor MP64, the one end of the capacitor C61, and the one end of the capacitor C62, the drain thereof is connected to the power supply line VCCP, and the source thereof is connected to the drains of the transistors MN66 and MN67. The gate of the transistor MN66 is connected to a control line AZL, the drain thereof is connected to the source of the transistor MN65 and the drain of the transistor MN67, and the source thereof is connected to a power supply line VSS1. The gate of the transistor MN67 is connected to a control line DSL, the drain thereof is connected to the source of the transistor MN65 and the drain of the transistor MN66, and the source thereof is connected to the anode of the light emitting element EL.

With this configuration, in the pixel PIX, when at least one of the transistors MN63 and MP64 is turned on, voltages across the respective capacitors C61 and C62 are set on the basis of a pixel signal supplied from the signal line SGL. The transistor MN67 is turned on and off on the basis of a signal of the control line DSL. The transistor MN65 causes a current corresponding to the voltages across the respective capacitors C61 and C62 to flow through the light emitting element EL during a period in which the transistor MN67 is in the ON state. The light emitting element EL emits light on the basis of the current supplied from the transistor MP65. In this manner, the pixel PIX emits light with luminance corresponding to the pixel signal. The transistor MN66 may be turned on and off on the basis of a signal of the control line AZL. Furthermore, the transistor MN66 may function as a resistance element having a resistance value corresponding to the signal of the control line AZL. In this case, the transistor MN65 and the transistor MN66 constitute a so-called source follower circuit.

5. EXEMPLARY USE CASES

Examples of some use cases (applications) of the display device 2 will be described with reference to FIGS. 20 to 27.

First Application Example

Figure 20:
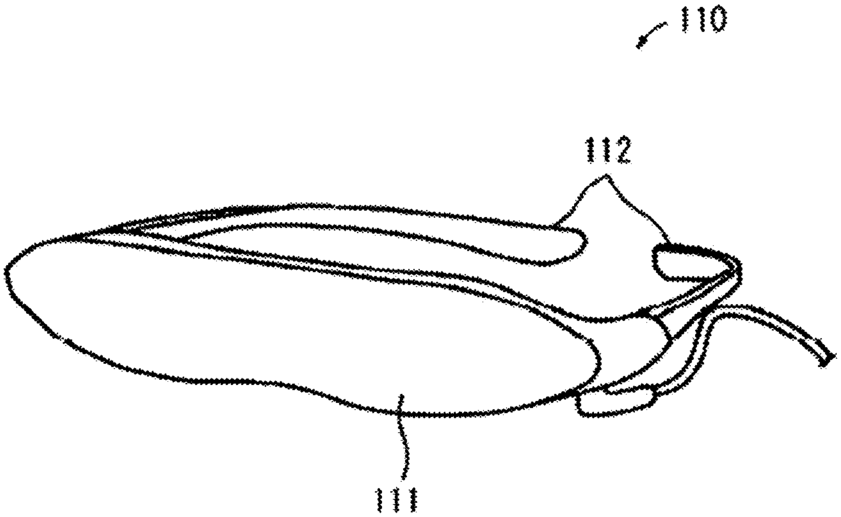
FIG. 20 is a diagram illustrating an exemplary appearance of a head mounted display 110.

FIG. 20 is a diagram illustrating an exemplary appearance of a head mounted display 110. The head mounted display 110 includes, for example on both sides of a spectacle-shaped display unit 111, temples 112 to be fitted on the head of a user. The technology according to the above embodiment and the like can be applied to such a head mounted display 110.

Second Application Example

Figure 21:
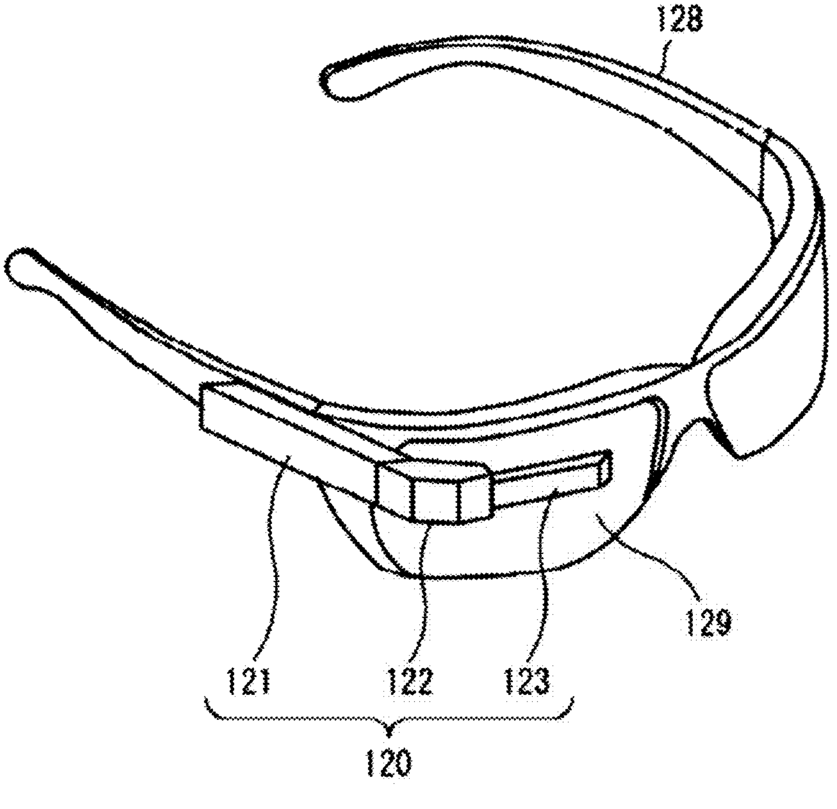
FIG. 21 is a diagram illustrating an exemplary appearance of another head mounted display 120.

FIG. 21 is a diagram illustrating an exemplary appearance of another head mounted display 120. A head mounted display 120 is a transmissive head mounted display including a body 121, an arm unit 122, and a lens barrel unit 123. The head mounted display 120 is mounted on eyeglasses 128. The body 121 has a control board for controlling the operation of the head mounted display 120 and a display unit. The display unit emits image light of a display image. The arm unit 122 connects the body 121 and the lens barrel unit 123 and supports the lens barrel unit 123. The lens barrel unit 123 projects image light supplied from the body 121 via the arm unit 122 toward the eyes of a user via a lens 129 of the eyeglasses 128. The technology according to the above embodiment and the like can be applied to such a head mounted display 120.

Note that the head mounted display 120 is a so-called light guide plate-type head mounted display; however, it is not limited thereto, and, for example, a so-called birdbath-type head mounted display may be employed. The birdbath-type head mounted display includes, for example, a beam splitter and a partially transparent mirror. The beam splitter outputs light encoded with image information toward the mirror, and the mirror reflects the light toward the eyes of a user. Both the beam splitter and the partially transparent mirror are partially transparent. As a result, light from the surrounding environment reaches the eyes of the user.

Third Application Example

Figure 22:
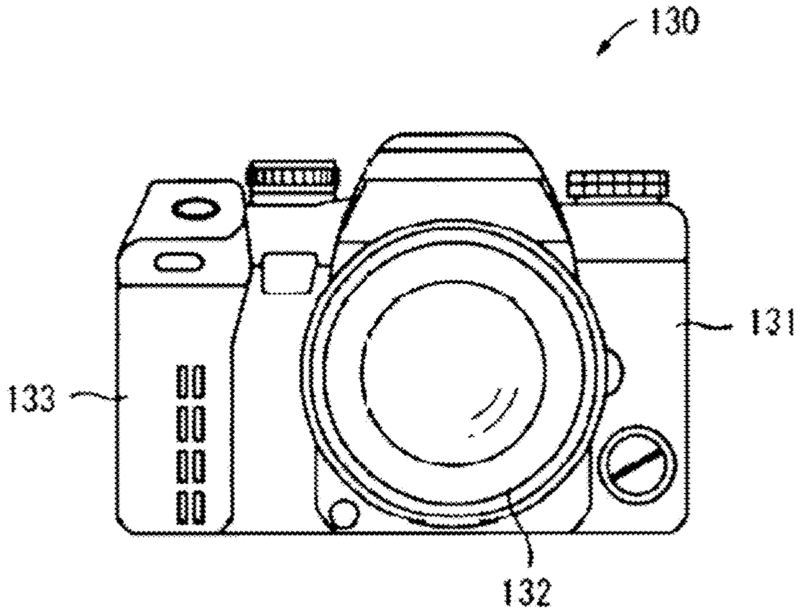
FIG. 22 is a diagram illustrating an exemplary appearance of a digital still camera 130.
Figure 23:
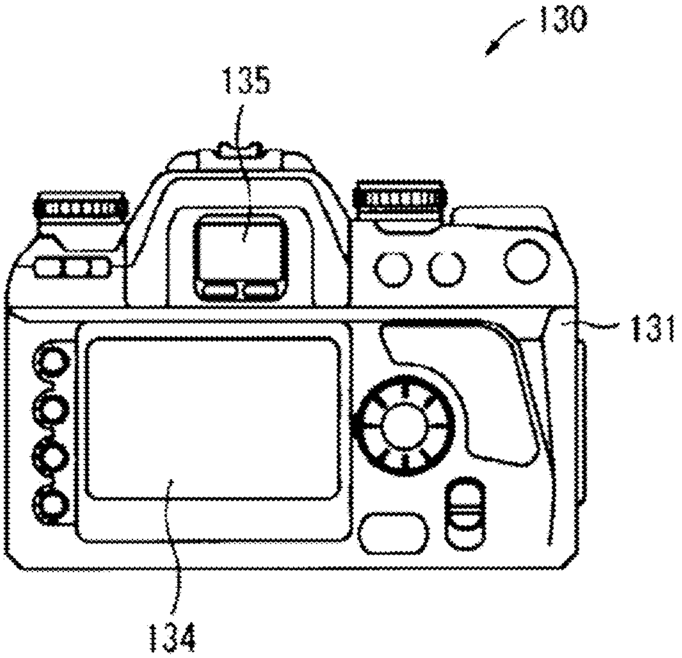
FIG. 23 is a diagram illustrating an exemplary appearance of the digital still camera 130.

FIGS. 22 and 23 are diagrams illustrating an exemplary appearance of a digital still camera 130. FIG. 22 is a front view, and FIG. 23 is a rear view. The digital still camera 130 is a lens interchangeable single-lens reflex-type camera and includes a camera body 131, an imaging lens unit 132, a grip unit 133, a monitor 134, and an electronic viewfinder 135. The imaging lens unit 312 is an interchangeable lens unit and is included in the vicinity of substantially the center of the front face of the camera body 311. The grip unit 133 is included on the left side of the front face of the camera body 311, and a photographer grips the grip unit 133. The monitor 134 is included on the left side of substantially the center of the back face of the camera body 131. The electronic viewfinder 135 is included above the monitor 14 on the back face of the camera body 131. By looking into the electronic viewfinder 135, the photographer can visually recognize an optical image of a subject guided from the imaging lens unit 132 and determine the composition. The technology according to the above embodiment and the like can be applied to the electronic viewfinder 135.

Fourth Application Example

Figure 24:
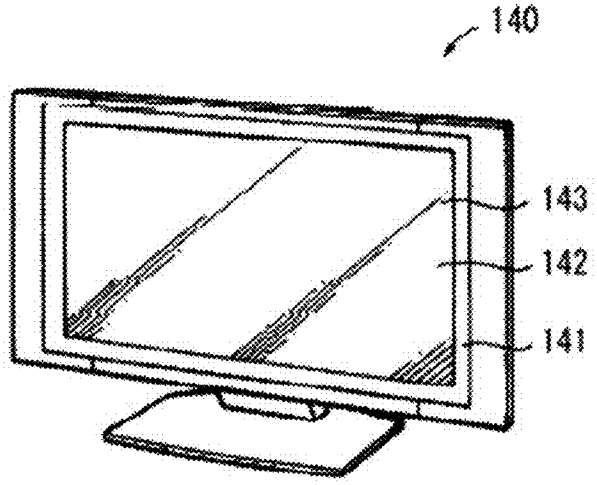
FIG. 24 is a diagram illustrating an exemplary appearance of a television device 140.

FIG. 24 is a diagram illustrating an exemplary appearance of a television device 140. The television device 140 includes a video display screen unit 141 including a front panel 142 and a filter glass 143. The technology according to the above embodiment and the like can be applied to the video display screen unit 141.

Fifth Application Example

Figure 25:
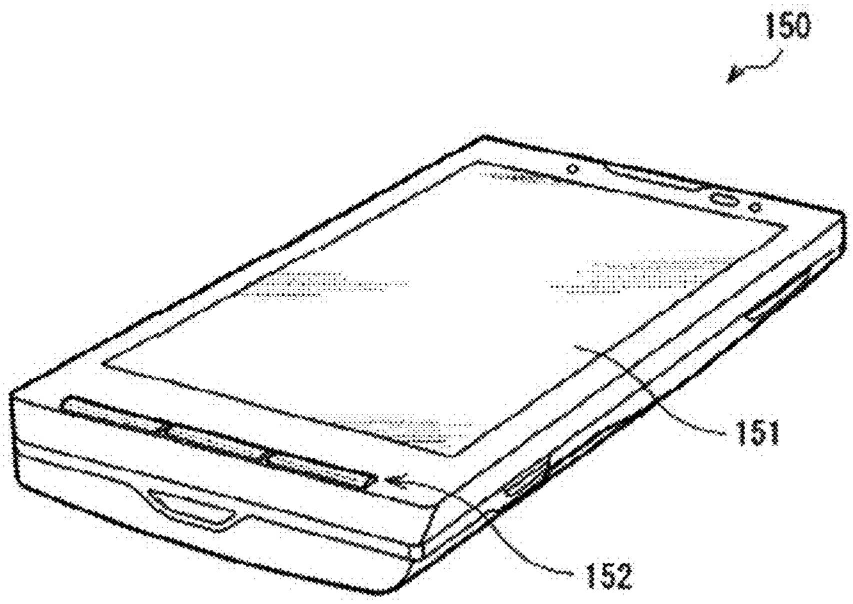
FIG. 25 is a diagram illustrating an exemplary appearance of a smartphone 150.

FIG. 25 is a diagram illustrating an exemplary appearance of a smartphone 150. The smartphone 150 includes a display unit 151 that displays various types of information and an operation unit 152 including a button or the like that receives operation input by a user. The technology according to the above embodiment and the like can be applied to the display unit 151.

Sixth Application Example

Figure 26:
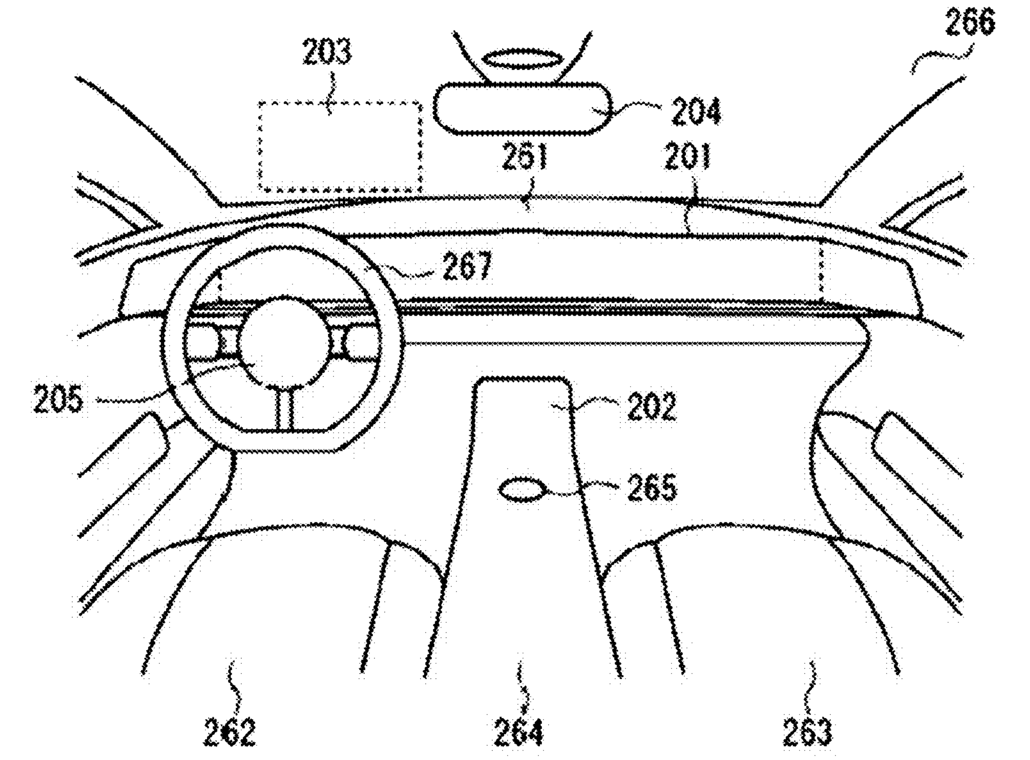
FIG. 26 is a diagram illustrating a configuration example of a vehicle to which the technology of the present disclosure is applied.
Figure 27:
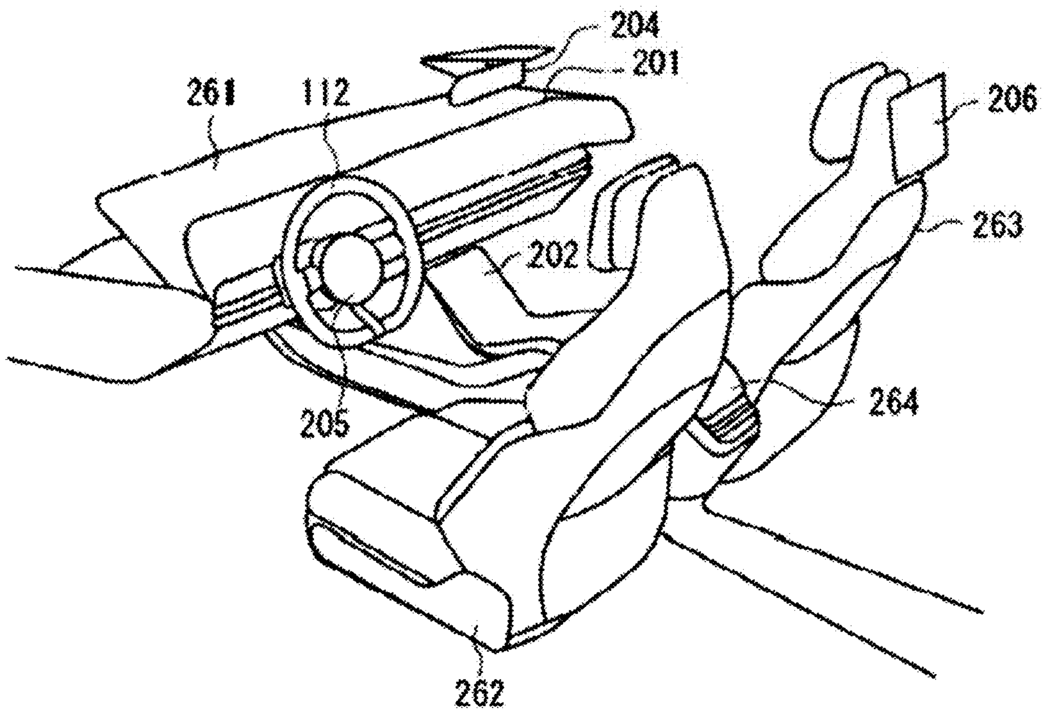
FIG. 27 is a diagram illustrating a configuration example of a vehicle to which the technology of the present disclosure is applied.

FIGS. 26 and 27 are diagrams illustrating a configuration example of a vehicle to which the technology of the present disclosure is applied. FIG. 26 illustrates an example of the interior of the vehicle as viewed from the rear side of the vehicle, and FIG. 27 illustrates an example of the interior of the vehicle as viewed from the left rear side of the vehicle.

The vehicle of FIGS. 26 and 27 includes a center display 201, a console display 202, a head-up display 203, a digital rear mirror 204, a steering wheel display 205, and a rear entertainment display 106.

The center display 201 is disposed at a place on a dashboard 261 facing a driver's seat 262 and a passenger seat 263. In the drawing, an example of the center display 201 having a horizontally long shape extending from the driver's seat 262 side to the passenger seat 263 side is illustrated; however, the screen size and the installing place of the center display 201 are not limited thereto. The center display 201 can display information detected by various sensors. As a specific example, the center display 201 can display a captured image captured by an image sensor, a distance image to an obstacle ahead of or on a side of the vehicle measured by a ToF sensor, a body temperature of an occupant detected by an infrared sensor, or others. The center display 201 can be used to display, for example, at least one of safety-related information, operation-related information, a life log, health-related information, authentication or identification-related information, or entertainment-related information.

The safety-related information is information such as doze detection, looking-away detection, mischief detection of an onboard child, whether or not a seat belt is on, and detection of leaving of an occupant based on a detection result of a sensor. The operation-related information is gesture information regarding an operation of an occupant detected using a sensor. The gesture may include operations of various facilities in the vehicle and includes, for example, operations of an air conditioner, a navigation device, an audio visual (AV) device, a lighting device, and the like. The life log includes a life log of all the occupants. For example, the life log includes an action record of each occupant. By acquiring and storing the life log, it is possible to confirm the state of the occupants when an accident occurs. The health-related information includes body temperatures of the occupants detected using a temperature sensor and information of the health condition of the occupants estimated on the basis of the detected body temperatures. Alternatively, the information of the health condition of the occupants may be estimated on the basis of the faces of the occupants captured by an image sensor. Furthermore, the information of the health condition of the occupants may be estimated on the basis of the content of answers of the occupants obtained through conversion with the occupants using automated voice. The authentication or identification-related information includes information of a keyless entry function for performing face authentication using a sensor, an automatic adjustment function of the height or position of the seats by face identification, or others. The entertainment-related information includes operation information of an AV device by an occupant detected by a sensor, information of content to be displayed that is suitable for an occupant detected and recognized by a sensor, or others.

The console display 202 can be used to display the life log information, for example. The console display 202 is disposed near a shift lever 265 in a center console 264 between the driver's seat 262 and the passenger seat 263. The console display 202 can also display information detected by various sensors. The console display 202 may also display an image of the surroundings of the vehicle captured by an image sensor or may display a distance image to an obstacle around the vehicle.

The head-up display 203 is virtually displayed behind a windshield 266 and ahead of the driver's seat 262. The head-up display 203 can be used to display, for example, at least one of safety-related information, operation-related information, a life log, health-related information, authentication or identification-related information, or entertainment-related information. Since the head-up display 203 is often virtually disposed in front of the driver's seat 262, it is suitable for displaying information directly related to the operation of the vehicle, such as the speed of the vehicle, the remaining amount of fuel, and the remaining amount of the battery.

The digital rear mirror 204 can display not only the back of the vehicle but also the state of an occupant in the back seat and thus can be used to display the life log information of the occupant in the back seat, for example.

The steering wheel display 205 is disposed in the vicinity of the center of the steering wheel 267 of the vehicle. The steering wheel display 205 can be used to display, for example, at least one of safety-related information, operation-related information, a life log, health-related information, authentication or identification-related information, or entertainment-related information. In particular, since the steering wheel display 205 is close to the driver's hands, it is suitable for displaying the life log information such as the body temperature of the driver or for displaying information related to the operation of the AV device, the air conditioner, or the like.

The rear entertainment display 206 is attached to the back side of the driver's seat 262 of the passenger seat 263 and is for viewing by the occupant in the back seat. The rear entertainment display 206 can be used to display, for example, at least one of safety-related information, operation-related information, a life log, health-related information, authentication or identification-related information, or entertainment-related information. In particular, since the rear entertainment display 206 is in front of the occupant in the back seat, information related to the occupant in the back seat is displayed. The rear entertainment display 206 may display, for example, information regarding the operation of the AV device or the air conditioner or may display a result of measuring the body temperature or the like of the occupant in the back seat by a temperature sensor.

The technology according to the above embodiment and the like can be applied to the center display 201, the console display 202, the head-up display 203, the digital rear mirror 204, the steering wheel display 205, and the rear entertainment display 206.

Note that the effects described herein are merely examples, and it is not limited to the disclosed content. There may be other effects.

Although the embodiments of the disclosure have been described above, the technical scope of the disclosure is not limited to the above embodiments as they are, and various modifications can be made without departing from the gist of the disclosure. In addition, components of different embodiments and modifications may be combined as appropriate.

Note that the present technology can also have the following configurations.

(1) A display device comprising:
a voltage generation circuit; and
a plurality of pixels each emitting light with luminance corresponding to a gradation voltage obtained from a generated voltage of the voltage generation circuit, wherein
the generated voltage includes:
a ramp voltage; and
a non-ramp voltage including a voltage outside a voltage range of the ramp voltage, and
the non-ramp voltage includes a voltage corresponding to a gradation voltage that minimizes luminance of the pixel.

(2) The display device according to (1), wherein
the non-ramp voltage corresponds to a gradation voltage that minimizes luminance of the pixel, and
the ramp voltage linearly changes between a voltage corresponding to a gradation voltage for making luminance of the pixel second lowest and a voltage corresponding to a gradation voltage that maximizes luminance of the pixel.

(3) The display device according to (1) or (2), wherein
the voltage generation circuit generates the non-ramp voltage at time outside a generation period of the ramp voltage.

(4) The display device according to (3), comprising:
an H-DRV that controls the gradation voltage of each of the plurality of pixels by holding a voltage of the generated voltage as of desired time.

(5) The display device according to (4), wherein
the voltage generation circuit generates the non-ramp voltage at time separated from the generation period of the ramp voltage on a time axis.

(6) The display device according to (5), wherein
a length of the separation in time is equal to or longer than a delay time of control of a gradation voltage of a pixel farthest from the H-DRV with respect to control of a gradation voltage of a pixel closest to the H-DRV among the plurality of pixels.

(7) The display device according to any one of (3) to (6), wherein
the voltage generation circuit continues to generate the non-ramp voltage for a certain period.

(8) The display device according to (1) or (2), wherein
a gradation voltage obtained from the ramp voltage and a gradation voltage obtained from the non-ramp voltage among gradation voltages obtained from the generated voltage are supplied to the pixel via different routes.

(9) The display device according to (8), wherein
the voltage generation circuit includes:
a first buffer circuit that outputs the ramp voltage; and
a second buffer circuit that outputs the non-ramp voltage.

(10) The display device according to (9), comprising:
a plurality of switches each connected between a corresponding pixel and the first buffer circuit; and
a plurality of switches each connected between a corresponding pixel and the second buffer circuit.

REFERENCE SIGNS LIST

1 DISPLAY SYSTEM
2 DISPLAY DEVICE
21 PIXEL ARRAY UNIT
22 V-DRV
23 H-DRV
231 VOLTAGE GENERATION CIRCUIT
231-1 VOLTAGE GENERATION CIRCUIT
231-2 VOLTAGE GENERATION CIRCUIT
232 SELECTOR
233 COUNTER
24 SIGNAL PROCESSING UNIT
241 GAMMA VOLTAGE GENERATING CIRCUIT
25 VOLTAGE GENERATION CIRCUIT
3 DISPLAY CONTROLLER
31 VLOGIC UNIT
32 HLOGIC UNIT
4 TIMING CONTROLLER
41 CLOCK GENERATOR
42 TIMING GENERATOR
43 IMAGE PROCESSING UNIT
5 DATA INPUT I/F UNIT
51 IMAGE I/F UNIT
52 DATA S/P UNIT
53 CLOCK CONTROL UNIT
54 H/V SYNCHRONIZATION UNIT
91 LIGHT EMITTING ELEMENT
92 TRANSISTOR
93 TRANSISTOR
94 TRANSISTOR
95 CAPACITOR
96 CAPACITOR
DL CONTROL LINE
DS CONTROL SIGNAL
SG GRADATION VOLTAGE
SL SIGNAL LINE
SW SWITCH
SW2 SWITCH
VG GENERATED VOLTAGE
VG0 VOLTAGE
VG1 VOLTAGE
VGMAX VOLTAGE
VN NON-RAMP VOLTAGE
VR RAMP VOLTAGE
WL CONTROL LINE
WS CONTROL SIGNAL

The invention claimed is:

1. A display device comprising:

a voltage generation circuit; and a plurality of pixels each emitting light with luminance corresponding to a gradation voltage obtained from a generated voltage of the voltage generation circuit, wherein the generated voltage includes:

a ramp voltage; and a non-ramp voltage including a voltage outside a voltage range of the ramp voltage, and the non-ramp voltage includes a voltage corresponding to a gradation voltage that minimizes luminance of the pixel.

2. The display device according to claim 1, wherein the non-ramp voltage corresponds to a gradation voltage that minimizes luminance of the pixel, and the ramp voltage linearly changes between a voltage corresponding to a gradation voltage for making luminance of the pixel second lowest and a voltage corresponding to a gradation voltage that maximizes luminance of the pixel.

3. The display device according to claim 1, wherein the voltage generation circuit generates the non-ramp voltage at time outside a generation period of the ramp voltage.

4. The display device according to claim 3, further comprising:

an H-DRV that controls the gradation voltage of each of the plurality of pixels by holding a voltage of the generated voltage as of desired time.

5. The display device according to claim 4, wherein the voltage generation circuit generates the non-ramp voltage at time separated from the generation period of the ramp voltage on a time axis.

6. The display device according to claim 5, wherein a length of the separation in time is equal to or longer than a delay time of control of a gradation voltage of a pixel farthest from the H-DRV with respect to control of a gradation voltage of a pixel closest to the H-DRV among the plurality of pixels.

7. The display device according to claim 3, wherein the voltage generation circuit continues to generate the non-ramp voltage for a certain period.

8. The display device according to claim 1, wherein a gradation voltage obtained from the ramp voltage and a gradation voltage obtained from the non-ramp voltage among gradation voltages obtained from the generated voltage are supplied to the pixel via different routes.

9. The display device according to claim 8, wherein the voltage generation circuit includes:

a first buffer circuit that outputs the ramp voltage; and a second buffer circuit that outputs the non-ramp voltage.

10. The display device according to claim 9, further comprising:

a plurality of switches each connected between a corresponding pixel and the first buffer circuit; and a plurality of switches each connected between a corresponding pixel and the second buffer circuit.

* * * * *